US010210710B2

(12) United States Patent
Lyons et al.

(10) Patent No.: US 10,210,710 B2
(45) Date of Patent: Feb. 19, 2019

(54) GAMING DEVICE, SYSTEM AND METHOD FOR PROVIDING CASCADING PROGRESSIVE AWARDS

(71) Applicant: Bally Gaming, Inc., Las Vegas, NV (US)

(72) Inventors: Martin S. Lyons, Las Vegas, NV (US); Bryan M. Kelly, Alamo, CA (US)

(73) Assignee: Bally Gaming, Inc., Las Vegas, NV (US)

( * ) Notice: Subject to any disclaimer, the term of this patent is extended or adjusted under 35 U.S.C. 154(b) by 513 days.

(21) Appl. No.: 14/812,020

(22) Filed: Jul. 29, 2015

(65) Prior Publication Data

US 2016/0055718 A1 Feb. 25, 2016

Related U.S. Application Data

(60) Provisional application No. 62/039,323, filed on Aug. 19, 2014.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2018.01) |
| ***G07F 17/32*** | (2006.01) |

(52) U.S. Cl.
CPC ................................ *G07F 17/3258* (2013.01)

(58) Field of Classification Search
USPC ..... 463/20, 22, 25, 27, 39; 273/85, 138, 292
See application file for complete search history.

(56) References Cited

U.S. PATENT DOCUMENTS

| | | | |
|---|---|---|---|
| 4,837,728 | A | 6/1989 | Barrie et al. |
| 4,861,041 | A | 8/1989 | Jones et al. |
| 4,964,638 | A | 10/1990 | Ishida |
| 5,042,810 | A | 8/1991 | Williams |
| 5,116,055 | A | 5/1992 | Tracy |
| 5,249,800 | A | 10/1993 | Hilgendorf et al. |
| 5,280,909 | A | 1/1994 | Tracy |
| 5,344,144 | A | 9/1994 | Canon |

(Continued)

FOREIGN PATENT DOCUMENTS

| | | | |
|---|---|---|---|
| AU | 589158 | B2 | 10/1989 |
| WO | 2005032675 | A8 | 6/2006 |

(Continued)

*Primary Examiner* — Adetokunbo O Torimiro
(74) *Attorney, Agent, or Firm* — Michael Blankstein; Philip J. Anderson

(57) ABSTRACT

A gaming device, system and method are set forth which includes a plurality of progressive jackpot pool levels with associated trigger conditions. When pool level jackpot is triggered through satisfaction of criteria, some or all of the current value of the pool is cascaded to another jackpot pool or may be wholly or partially awarded to the player. Where the trigger condition is related to the aggregated amount in the pool the triggering of one pool level may cascade and cause the awards of one or more subsidiary pools. The pools may contain value as well as entitlements to features. A video display displays the jackpot pools for the player to see representations of accumulations, the cascading of values to other pools and the award of all or portions of the pools to a player.

14 Claims, 16 Drawing Sheets

(56) References Cited

U.S. PATENT DOCUMENTS 5,476,259 A * 12/1995 Weingardt .............. A63F 3/081 463/25
5,564,700 A 10/1996 Celona
5,580,309 A 12/1996 Piechowiak et al.
5,588,650 A 12/1996 Eman et al.
5,611,730 A 3/1997 Weiss
5,655,961 A 8/1997 Acres et al.
5,743,523 A 4/1998 Kelly et al.
5,855,515 A 1/1999 Pease et al.
5,876,284 A 3/1999 Acres et al.
5,885,158 A 3/1999 Torango et al.
5,941,773 A 8/1999 Harlick
6,012,982 A 1/2000 Piechowiak et al.
6,089,980 A 7/2000 Gauselmann
6,110,043 A 8/2000 Olsen
6,146,273 A 11/2000 Olsen
6,224,482 B1 5/2001 Bennett
6,241,608 B1 6/2001 Torango
6,592,460 B2 7/2003 Torango
6,776,715 B2 8/2004 Price
7,056,215 B1 6/2006 Olive
7,108,603 B2 9/2006 Olive
7,578,740 B2 8/2009 Marks et al.
7,601,060 B2 10/2009 Baerlocher et al.
7,651,392 B2 1/2010 Pennington et al.
7,736,226 B1 6/2010 Luciano, Jr.
7,753,784 B2 7/2010 Baerlocher
7,850,524 B2 12/2010 Jackson
7,862,427 B2 1/2011 Nguyen et al.
7,883,410 B2 2/2011 Soukup et al.
7,914,377 B2 3/2011 Benbrahim et al.
7,934,993 B2 5/2011 Kuehling et al.
7,963,846 B2 6/2011 Englman et al.
7,988,552 B2 8/2011 Thomas
8,038,528 B2 10/2011 Englman et al.
8,052,148 B1 11/2011 Kelly et al.
8,070,605 B2 12/2011 Tien et al.
8,137,180 B2 3/2012 Thomas et al.
8,147,320 B2 4/2012 Englman et al.
8,157,641 B2 4/2012 Englman et al.
8,182,338 B2 5/2012 Thomas
8,202,160 B2 6/2012 Englman et al.
8,251,803 B2 8/2012 Nelson
8,251,805 B2 8/2012 Englman et al.
8,257,169 B2 9/2012 Englman
8,267,777 B2 9/2012 Jaffe
8,272,949 B2 9/2012 Dickerson
8,287,366 B2 10/2012 Olive
8,303,401 B2 11/2012 Yoshimura
8,328,626 B2 12/2012 Hornik
8,342,948 B2 1/2013 Lyons et al.
8,342,956 B2 1/2013 Anderson
8,353,753 B2 1/2013 Thomas
8,357,038 B2 1/2013 D'Amico et al.
8,360,851 B2 1/2013 Aoki et al.
8,371,928 B2 2/2013 Englman et al.
8,376,841 B2 2/2013 Boesen et al.
8,435,111 B2 5/2013 Filipour et al.
8,439,749 B2 5/2013 Anderson et al.
8,449,387 B2 5/2013 Englman et al.
8,449,388 B2 5/2013 Nicely et al.
8,454,434 B1 6/2013 Schaefer et al.
8,460,083 B2 6/2013 Joshi et al.
8,480,485 B2 7/2013 Englman et al.
8,480,489 B2 7/2013 Nelson
8,491,390 B2 7/2013 Cregan
8,506,391 B2 8/2013 Jaffe et al.
8,506,392 B2 8/2013 Jaffe
8,512,132 B2 8/2013 Nicely
8,517,828 B2 8/2013 Dewaal et al.
8,523,665 B2 9/2013 Baerlocher
8,562,418 B2 10/2013 Gomez et al.
2003/0027625 A1 2/2003 Rowe
2005/0064930 A1 3/2005 Jubinville et al.
2007/0060319 A1 3/2007 Block et al.
2007/0298873 A1 12/2007 Nguyen et al.
2008/0020831 A1 1/2008 Ikehara et al.
2008/0032785 A1* 2/2008 Crowder, Jr. ........... G07F 17/32 463/25
2008/0108430 A1 5/2008 Evans
2008/0108431 A1 5/2008 Cuddy et al.
2008/0194312 A1 8/2008 Nelson et al.
2008/0234036 A1 9/2008 Reddicks et al.
2009/0042643 A1 2/2009 Gagner et al.
2009/0124362 A1 5/2009 Cuddy et al.
2009/0124364 A1 5/2009 Cuddy et al.
2009/0124391 A1 5/2009 Nelson et al.
2009/0275400 A1 11/2009 Rehm et al.
2010/0048284 A1 2/2010 Jaffe
2010/0087256 A1 4/2010 Frattinger et al.
2010/0113131 A1 5/2010 Aoki et al.
2010/0124989 A1 5/2010 Englman et al.
2010/0222138 A1 9/2010 Luciano, Jr. et al.
2011/0111843 A1 5/2011 Nicely et al.
2011/0111844 A1 5/2011 Anderson et al.
2011/0124408 A1 5/2011 Ward
2011/0195773 A1 8/2011 Michaelson et al.
2011/0201403 A1 8/2011 Jaffe et al.
2011/0207526 A1 8/2011 Kamano
2011/0263317 A1 10/2011 Marks et al.
2012/0004028 A1 1/2012 Guan et al.
2012/0046098 A1 2/2012 Cuddy
2012/0108324 A1 5/2012 King
2012/0129594 A1 5/2012 Green et al.
2012/0149462 A1 6/2012 Vasquez et al.
2012/0165092 A1 6/2012 Saffari et al.
2012/0184365 A1 7/2012 Pawloski et al.
2012/0252562 A1 10/2012 Aoki
2012/0264507 A1 10/2012 Cregan et al.
2012/0315982 A1 12/2012 Ward
2012/0329552 A1 12/2012 Caspers et al.
2013/0045785 A1 2/2013 Gomez
2013/0053135 A1 2/2013 King
2013/0065677 A1 3/2013 Baerlocher
2013/0084950 A1* 4/2013 Olsen .................. G07F 17/3258 463/25
2013/0090160 A1 4/2013 Iyer et al.
2013/0095918 A1 4/2013 Cuddy et al.
2013/0116043 A1 5/2013 Baerlocher
2013/0165219 A1 6/2013 Kelly et al.
2013/0165220 A1 6/2013 Larsen
2013/0178260 A1 7/2013 Baerlocher et al.
2013/0178279 A1 7/2013 Kelly et al.
2013/0196740 A1 8/2013 Lafky et al.
2013/0203487 A1 8/2013 Baerlocher et al.
2013/0225277 A1 8/2013 Hughes

FOREIGN PATENT DOCUMENTS

WO 2009061358 A1 5/2009
WO 2009091676 A1 7/2009

* cited by examiner

FIG. 8
BIG
WIN
BONUS CREDITS
74
1 CREDIT
CREDIT
150,17€
50470
BET
4,80€
50
WIN
520

14

GAMING DEVICE, SYSTEM AND METHOD FOR PROVIDING CASCADING PROGRESSIVE AWARDS

CROSS-REFERENCE TO RELATED APPLICATION

This application is a regular utility filing based upon and claiming priority to a prior filed U.S. Provisional Patent Application Ser. No. 62/039,323 filed Aug. 19, 2014 and titled "Gaming Device, System and Method for PROVIDING CASCADING PROGRESSIVE AWARDS" the disclosure of which is incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The field of the invention relates to gaming devices, methods and systems which provide for the accumulation and awarding of progressive prizes. More particularly it relates to gaming devices, methods and systems which provide for a plurality of mystery progressive jackpot prize levels where jackpot prizes may be awarded and/or amounts from one level can move to another level and for graphics schema to present the progressive prize pools and awards.

2. Background

Various types of gaming devices have been developed with features designed to captivate and maintain player interest. In general, a gaming machine allows a player to play a base game of chance in exchange for a wager. In pay to play (P2P) gaming the wager has value such as wagering currency or credits representing currency. For novelty or "entertainment only" play such as play on a computer or mobile device the wagers are fictitious credits having no redemption value. Las Vegas style slot machines are an example of P2P gaming devices. Depending on the outcome of the base game, the player may be entitled to an award which is awarded to the player by the gaming machine, normally in the form of currency or game credits. Gaming devices may include flashing displays, lighted displays or sound effects to capture a player's interest in a gaming device.

Many modern gaming devices incorporate a secondary, feature or bonus game. These secondary games may be triggered by one or more outcomes from the base game such as, for example, a predefined symbol combination. These types of triggers are sometimes referred to as symbol driven triggers since they are determined by base game symbols. When the symbol combination occurs the gaming device processor enables the display for play of a secondary game. The secondary game may take the form of a number of free plays of the base game, a random selection game where the player selects from displayed offerings to reveal prizes, the play of a secondary game or the like. As described in Lyons, et al, U.S. Pat. No. 8,342,948 titled "System, Apparatus and Method for Saving Game State and For Utilizing States on Different Gaming Devices", the disclosure of which is incorporated by reference, the feature or secondary game has an expected value, e.g. what it is expected to pay back to the player.

It is known to provide symbol-triggered progressive prizes. For example gaming devices may be linked on a network and a controller allocates a percentage of at least the jackpot qualifying wagers to a progressive pool. The pool increments typically from a predetermined start or "seed" value based upon the allocations until a player obtains the jackpot winning outcome whereupon the prize is awarded to the player and the progressive pool value resets to its seed value. It has been known to provide multiple symbol-based progressive pools. For example for video Poker it is known to operate a top level progressive pool to be awarded when the player obtain a Royal Flush and perhaps one other second level progressive to be awarded when the player obtains four Aces. Tracy, U.S. Pat. No. 5,116,055 issued May 26, 1992 and titled "Progressive Jackpot Gaming System Linking Gaming Machines with Different Hit Frequencies and Denominations", discloses linking games with different "architectures" to a symbol-based progressive.

In addition to symbol-triggered progressive jackpots there is also known to provide mystery jackpots to players over and above any awards from the play of the base game or any base game symbol triggered feature. Often these mystery prizes are progressive prizes which may be arranged in and triggered in a variety of manners. For example, in Frankovic et al, Australian Patent 589158 there is disclosed a "coin-in" mystery progressive where for each game playing on the link game the amounts wagered are counted toward a random trigger value. When the count equals or exceeds the trigger value the prize is awarded. As can be seen the awarding of the prize is not related to any symbol trigger. Other examples are Olive, U.S. Pat. No. 7,108,603 issued Sep. 19, 2006 and titled "Slot Machine Game and System with Improved Jackpot Feature" where there is a disclosed networked gaming machines contributing, from the wagers for the play of the base games, to a progressive jackpot. Based upon the value of the wager W at a gaming device to play a base game and the predetermined turnover for the jackpot, a virtual lottery is conducted (out of sight of the player) with each base game play where the odds of winning relate to the wager W and jackpot turnover amount. When the feature is triggered play of a feature game determines the size of the award based upon a score from the feature game. Torango, U.S. Pat. No. 6,592,460 issued Jul. 15, 2003 and titled "Progressive Wagering System" discloses a similar type of "hidden lottery" type of mystery prize. In Acres et al U.S. Reissued Pat. RE38,812, reissued Oct. 4, 2005 and titled Method and Apparatus for operating Networked Gaming Devices", the disclosure of which is incorporated by reference, there is disclosed a system based mystery jackpot which is triggered when the contributions from the linked gaming machines cause the progressive pool to reach a selected (and unrevealed) amount.

A drawback to these prior mystery progressive jackpot award techniques is that there is no graphic representation to provide the players with a gauge as to the accumulated value and how near it may be to being awarded. Another drawback is that even where multiple progressives are available to be won a player cannot win all of them simultaneously or portions of multiple mystery progressives simultaneously. Still further there is no mechanism where an award of a mystery prize may include the award of feature play which may be played on a variety of games. Also there is no mechanism by which some or all of the value accumulated into one level of a mystery progressive prize may be rolled into another level of mystery progressive prize to provide a large incremental increase which may push one or more levels of progressive prizes to be awarded.

In a field of gaming unrelated to progressives there is type of game sometimes referred to as a coin pusher game. As example of such a game as “Flip-it”. Broadly this is a mechanical wagering game presenting offset, stacked tiers populated by coins lying flat and grouped on top of each other. Mechanical pushers urge the coins of the tiers toward the edge of the tier. When a player inserts a coin mechanical spinners propel the coin to fall into one of the tiers. The object is to have the inserted coin cause some of the amassed coins to fall from the tiers to a pay-out chute. For example the inserted coin may land in the top tier and, under urging by a pusher, cause a portion of the coins to fall onto the lower tier whose pushers cause coins to fall to the pay-out chute. To provide a profit e.g. rake for the operator some coins may fall from the sides of the tiers into a cashbox. There are few Flip-it games remaining in casino; however they have proven to be an exciting and entertaining game for players since the players can see the interaction of the coins and pushers and see, for example, that a large group of coins are about to be paid.

It would be advantageous to provide some of the concepts of pusher games with the concept of mystery progressives to provide new and exciting features to players.

SUMMARY OF THE INVENTION

There is, therefore, set forth according to the present invention, a gaming device, system and method for providing cascading progressive awards for one or more gaming devices arranged for P2P or entertainment-style, play for fun, non-P2P gaming. The system includes one or more gaming devices each configured for receiving a wager from a player to play a base game, rendering a winning or losing outcome and issuing an award to the player for winning outcomes. For example the base game may be a video or electromechanical slot machine game. A controller is configured to allocate value to defined first and second progressive jackpot pools to progressively increase their values. The first progressive jackpot pool has a prize trigger value of X and the second progressive jackpot pool has a second trigger value of Y where $X<Y$. As but an example X may be randomly or pseudo-randomly selected between the values of \$10 and \$50 and Y may be randomly or pseudo-randomly selected between the values of \$100 and \$200. A video display displays graphical representations of the first and second progressive jackpot pools as a mass of objects whose accumulated mass is displayed to increase as the pool value increases. In an embodiment the display may display the masses of objects in levels or tiers with the display representing the first progressive jackpot pool shown as being offset and above the display representing the second progressive jackpot pool. The controller is configured to (i) determine the current value of the first progressive pool with each allocated contribution and if the first progressive pool current value $\geq X$ to allocate at least a portion of the first progressive jackpot pool to the second progressive jackpot pool and (ii) determine with the allocation the current value of the second progressive pool and if the second progressive jackpot pool current value $\geq Y$ to award a progressive prize of at least a portion of the second progressive jackpot pool to said player.

In an embodiment the display may be controlled to display the first and second progressive jackpot pools as masses of coins in a cascading waterfall or lava flow. When the trigger occurs for the first progressive jackpot pool the display is controlled to depict some or all of the coins cascading into the second progressive jackpot pool.

In an embodiment when the trigger associated with X is satisfied the entire award from the first progressive jackpot pool is accumulated into the second progressive jackpot pool and if the accumulation causes the trigger value Y to be satisfied then all of Y is awarded to the player triggering the award.

In an embodiment when the trigger value of X is satisfied the entire amount of the first progressive prize, for example a lower prize-level tier, to accumulate into a higher second progressive prize-level tier whereupon none or only some of the value of the prize is awarded to the player In an embodiment at least one progressive jackpot pool may include a feature token represented as, for example, a distinctive icon in the mass of objects. The feature token may represent an entitlement to play a secondary or feature game having an expected value (EV). Upon triggering of a progressive jackpot trigger condition the token may be awarded to the player or may move to the next level progressive jackpot pool.

In an embodiment the progressive pools may be represented by coins reminiscent of the pusher-style games and the accumulation, pushing and cascading of coins may be modelled by physics algorithms such as by physics modelling software such as PhysX (by NVIDIA of Santa Clara, Calif.) or Havok® (by Havok of Dublin, Ireland).

In an embodiment the player may be entitled to a promotional award which may be represented as a unique icon displayed into the mass of objects as awarded to the player upon the occurrence of a trigger condition. For example the icon or token may represent a meal “comp” or an entitlement to a gift or entries into a drawing.

In an embodiment where the trigger condition for the first progressive jackpot pool is satisfied, all or a portion of the first progressive jackpot pool may move to be associated with the second progressive jackpot pool but may not be aggregated to determine if the second progressive jackpot pool trigger has been satisfied, Upon triggering of the award of all or a portion of the second progressive jackpot pool some or all of the allocated value from the first progressive jackpot pool may be awarded to the player.

In an embodiment there may be three levels of progressive jackpot pools.

In an embodiment the inventive features herein may be incorporated into a standalone game coupled to a single gaming device, may be operated over a large area network (LAN) for example across a casino floor where linked games contribute toward achieving the trigger conditions or over a wide area network (WAN) across several casino properties, over the Internet or broadband networks to computers and/or mobile devices and can be operated as a feature associated with P2P games as well as play for fun style games. The feature can be configured as an original equipment manufacturer (OEM) feature or can be provided as an aftermarket feature for existing gaming devices.

In an embodiment where the features are incorporated into linked games large group video displays may be provided to show the accumulation of the progressive awards such as, for example, masses of coins in a cascading waterfall or lava flow.

Other features and advantages will become evident upon review of the following description and drawings.

DESCRIPTION

Figure 1:
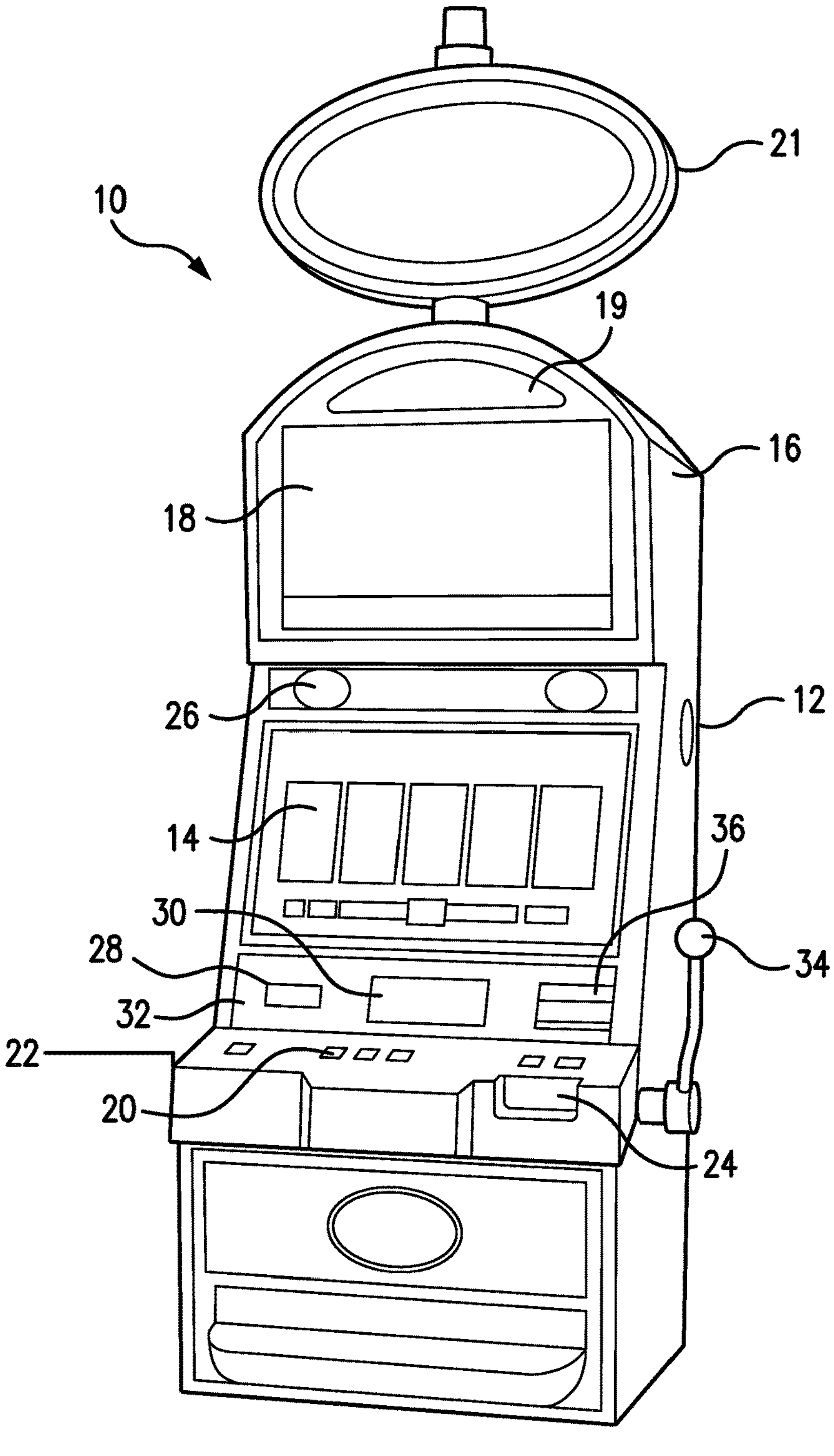
FIG. 1 illustrates an example of a gaming device.

Referring now to the drawings, wherein like reference numbers denote like or corresponding elements throughout the drawings, and more particularly referring to FIG. 1, a gaming device 10 is shown according to the various embodiments of the present invention. The gaming device 10 includes cabinet 12 providing an enclosure for the several components of the gaming device 10 and associated equipment. A primary game display 14 is mounted to the cabinet 12. The primary game display 14 may be a video display such as an LCD, plasma, OLED or other electronic display as are known in the art. The primary game display 14 may also be embodied as a combination of two or more electronic displays disposed in an adjacent overlapping or overlying arrangement or may be embodied as an electro-mechanical display such as a stepper-base slot machine or a combination of video and electro-mechanical displays as is known in the art. The primary game display 14 may be mounted to one or more of a door for the cabinet 12 or the cabinet chassis itself. The primary game display 14 is located to display game content (and if desired other content) to the player. For example, the game content may be base game outcomes presented by a plurality of video spinning reels displaying symbols the combinations of which define winning or losing outcomes, video Poker, Keno or other form of casino wagering base game as is known in the art. While the following description of the various embodiments of the present invention is directed to video reel-spinning games, it should be understood that the invention could be applied to other games including those mentioned above as well. Features such as bonus/feature games including the type described herein may also be presented at the primary game display 14 as hereinafter described. The foregoing description should not be deemed as limiting the content (graphics, video or text) which can be displayed at the primary game display 14. Touch screen input functionality may be associated with the primary game display 14 to enable the player to interact with the video content such as the game.

The gaming device 10 also includes in one or more embodiments a top box 16 which may support a printed back-lit glass (not shown) as is known in the art depicting the rules, award schedule, attract graphics or it may support a secondary video display 18 which may be of one of the types described above with reference to the primary game display 14. The top box 16 may also support a backlit glass with graphics defining a marquee 19 and a topper 21 including additional graphics. These video displays such as the primary display 14 and secondary display 18 may be standard 17 or 19 inch CRT or flat panel video displays.

While the gaming device 10 described above includes only two video displays it should be understood that some gaming devices have three or more displays. For example the topper 21 could include or be replaced by a third video display. It should also be understood that all of a plurality of video displays could be combined into a single electronic video display disposed on the cabinet 12 is a portrait mode or as curved displays as described in, for example, Kelly et al, US Pub App 2012/0004030 filed Jun. 30, 2010 and titled "Video Display Having a Curved Unified Display" and Myers, U.S. D706,741 filed Dec. 6, 2012 and titled "Gaming Machine Cabinet".

To enable a player to provide input to the controller for the gaming device 10 a plurality of buttons 20 may be provided on a button deck 22 for the gaming device 10. Additionally and alternatively one or both of the primary and secondary game displays 14, 18 may include touch screen input interface(s) as are known in the art. Most typically inasmuch as the primary game display 14 is positioned nearer the player and in a position for player touch interaction, only the primary display 14 has touch screen functionality.

Video content for display at the primary and secondary displays 14, 18 is crafted by designers to be adapted for display at one or more of the displays. For example, a video spinning real slot machine game and bonus and secondary features are designed to be displayed solely at the primary game display 14 for play and interaction by the player. Meters (credit and win meters) are also typically displayed at the primary display 14 as well has other icons such as a "Help Screen" call-up icon and touch enabled icons to, for example, select pay lines to play and wagers per selected pay line. Video content for the secondary display 18 may include, by way of example only, video content to identify the game, animated of video content to attract players to the game, the game pay table (as well as highlighting wins on the pay table as they occur, progressive jackpot information or the like. It has been known to, in features triggered from the base game, simultaneously display cooperative video content on both of the primary and secondary displays 14, 18. It should be understood that for gaming devices 10, for the most part, the video content for the primary and secondary displays 14, 18 is related (since there is a common game theme presentation) but is different.

Buttons, selections or inputs are displayed at the primary game displays 14 and the player touching those icons or designated areas provides the required or desired input to configure and play the gaming device 10. The buttons 20 may be displayed and defined at a touch screen button panel interface of the type described in Kelly et al U.S. Pub. 2010/0113140A1 filed Nov. 16, 2009 and titled "Gesture Enhanced Input Device", the disclosure of which is incorporated herein. The touch screen button panel includes its video display which is smaller than the primary game display 14.

Other peripherals or associated equipment for the gaming device 10 include a bill/voucher acceptor 24 which reads and validates currency and vouchers for the player to establish credits for gaming on the gaming device 10 and one or more speakers 26 to provide audio to the player in association with the game play. To provide for communication between the gaming device 10 and a casino system, a player tracking module (PTM) 28 is mounted on the cabinet 12. PTM 28 has a PTM display 30 to display system related information to the player. The PTM display 30 may be a small LCD, plasma or OLED display with touch screen functionality. In an embodiment the community games and features described herein are displayed at the PTM display 30; however, as set forth below these presentations are preferably migrated to areas at the primary or secondary displays 14, 18. A card reader 32 is provided to read a machine readable component on a player loyalty card issued to the player to identify the player to the casino system as in known in the art. A ticket printer 36 may be provided as well on the PTM 28 or elsewhere on the gaming device 10 to provide printed value ticket vouchers to players as is known in the art.

Some functionality of the PTM 28 may be provided by a video switcher and touch router device as is described in Kelly et al, U.S. Pat. No. 8,241,123 entitled "Video Switcher and Touch Router Method for a Gaming Machine" filed Jan. 8, 2009 and issued Aug. 14, 2012 the disclosure of which is incorporated by reference. System and externally based content including the community game presentations, system supported progressive games such as the games disclosed herein, player information, advertisements features as described herein or other information may be displayed at areas at one or more of the primary or secondary displays 14, 18 dispensing with the need for the separate PTM display 30. According to the disclosure of U.S. Pat. No. 8,241,123 when system content as well as the feature described herein is presented at the primary game display 14, the presentation of the base game played by the player is sized to share display real estate with the system content and/or feature as hereinafter described. The touch screen interface is also configured to interpret input "touches" from a player as relating to the base game content or the systems based content sharing the primary game display 14 real estate.

While the player may use the buttons 20 to prompt play of the game (or the touch screen input), alternatively the player may use a handle 34 to prompt an input as is known in the art.

Cabinet 12 may be a self-standing unit that is generally rectangular in shape and may be manufactured with reinforced steel or other rigid materials which are resistant to tampering and vandalism. Any shaped cabinet may be implemented with any embodiment of gaming device 10 so long as it provides access to a player for playing a game. For example, cabinet 12 may comprise a slant-top, bar-top, or table-top style cabinet, including a Bally Cinevision™ or CineReels™ cabinet. The gaming device 10 may include a controller and memory disposed within the cabinet 12 or may have thin client capability such as that some of the computing capability is maintained at a remote server.

The plurality of player-activated buttons at the button deck 22 may be used for various functions such as, but not limited to, selecting a wager denomination, selecting a game to be played, selecting a wager amount per game, initiating a game, or cashing out money from gaming device 10. Buttons may be operable as input mechanisms and may include mechanical buttons, electromechanical buttons or touch screen buttons. In one or more embodiments, buttons may be replaced with various other input mechanisms known in the art such as, but not limited to, touch screens, touch pad, track ball, mouse, switches, toggle switches, or other input means used to accept player input. For example, one input means is as disclosed in U.S. Pub. App. 2011/0111853, entitled "Universal Button Module," filed on Jan. 14, 2011 and/or U.S. Pub. App. 2010/0113140 entitled "Gesture Enhanced Input Device" filed Nov. 16, 2009, Kelly et al U.S. Pub. App. 2012/010833 filed Oct. 31, 2011 and titled "Gesture Enhanced Input Device" and Hilbert et al U.S. Pub App. 2013/0217491 filed Mar. 15, 2015 and titled "Virtual Button Deck with Sensory Feedback" both of which are hereby incorporated by reference. Player input may also be by providing touch screen functionality at the primary game display 14 and/or secondary game display 18.

Figure 6:
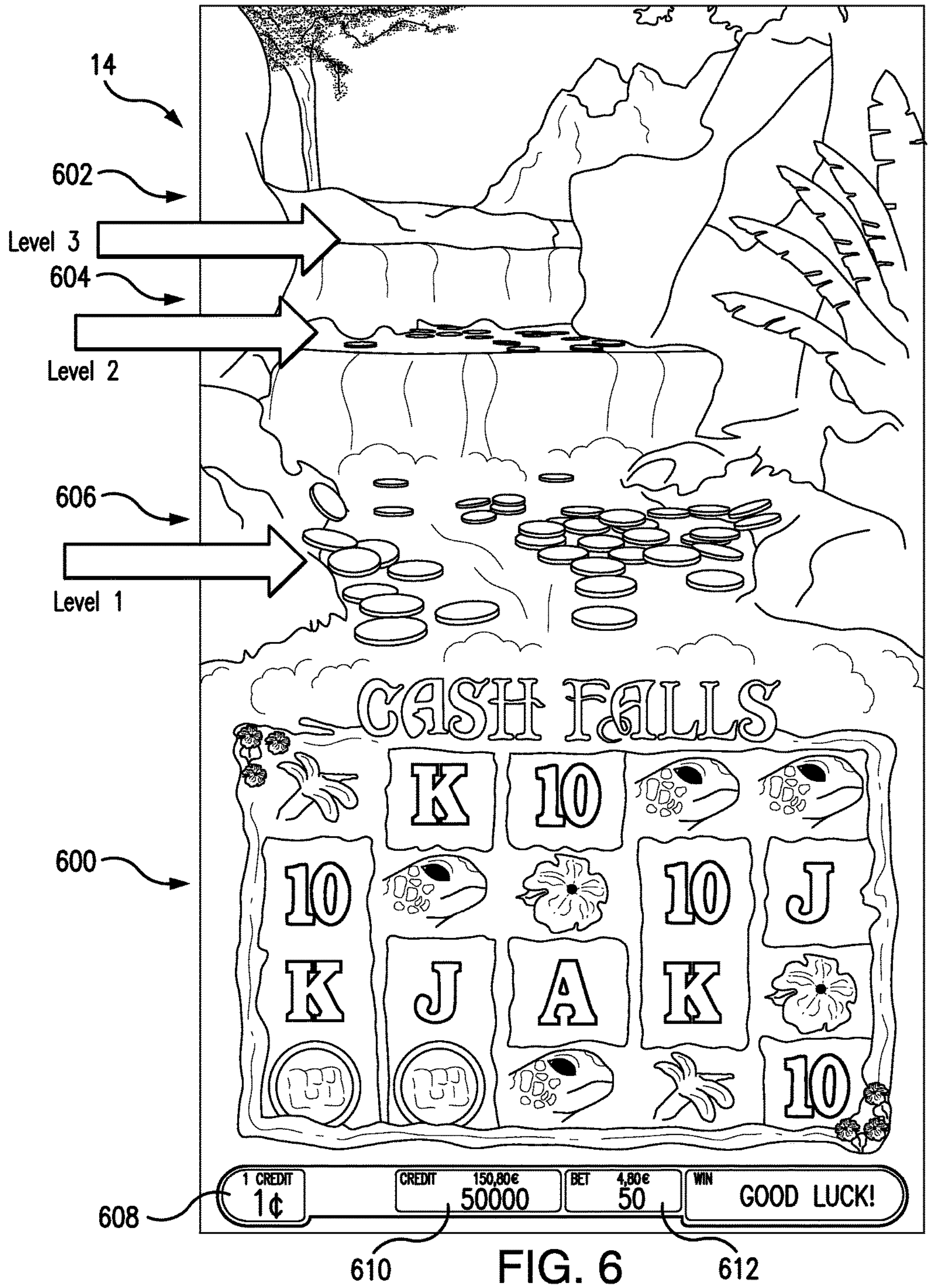
FIG. 6 shows the video display of a base game including representations of various levels representing progressive jackpot pools as would be viewed by a player according to an embodiment of the present invention.

The primary game display 14, according to the present invention, is controlled to present at least one instance of a base game of chance wherein, after making a wager of value, a player receives one or more outcomes from a set of potential outcomes. For example, one such game of chance is a video slot machine game. In other aspects of the invention, gaming machine 10 may present a video Keno game, a lottery game, a bingo game, a Class II bingo game, a roulette game, a craps game, a blackjack game, a mechanical or video representation of a wheel game or the like. The primary game display 14 may be controlled to present and play multiple instances of concurrent games. FIG. 6 depicts an embodiment where a video display 14 is shown with a five reel video slot machine base game 600 where the reels randomly select and display game symbols into a defined 4×5 display matrix to produce a winning or losing outcome.

According to the present invention a progressive such as a standalone progressive, LAN progressive or system based wide area network progressive (WAN progressive) is provided. The software and processing for the progressive may be included in the game CPU and memory structure or may be provided by a separate progressive controller included in the gaming device 10 and communicating with the game CPU. Where the progressive is a WAN based progressive, as discussed below, the progressive controller may be included as a software module at one or more system servers. The progressive controller may be in communication with one or more displays such as the primary display 14 or the secondary video display 18 and/or a large bank video display (not shown) associated with one or more groups of gaming devices 10. In an embodiment the progressive controller could be incorporated into the software/firmware of the PTM 28 or other related processor controlled equipment. The progressive controller may act in concert with or be incorporated into the game CPU to provide the features herein described. These features may also be provided, as suggested above, by the game CPU or by the progressive controller alone. Accordingly the progressive controller includes a processor and data structure for performing the tasks and features recited herein.

Figure 2A:
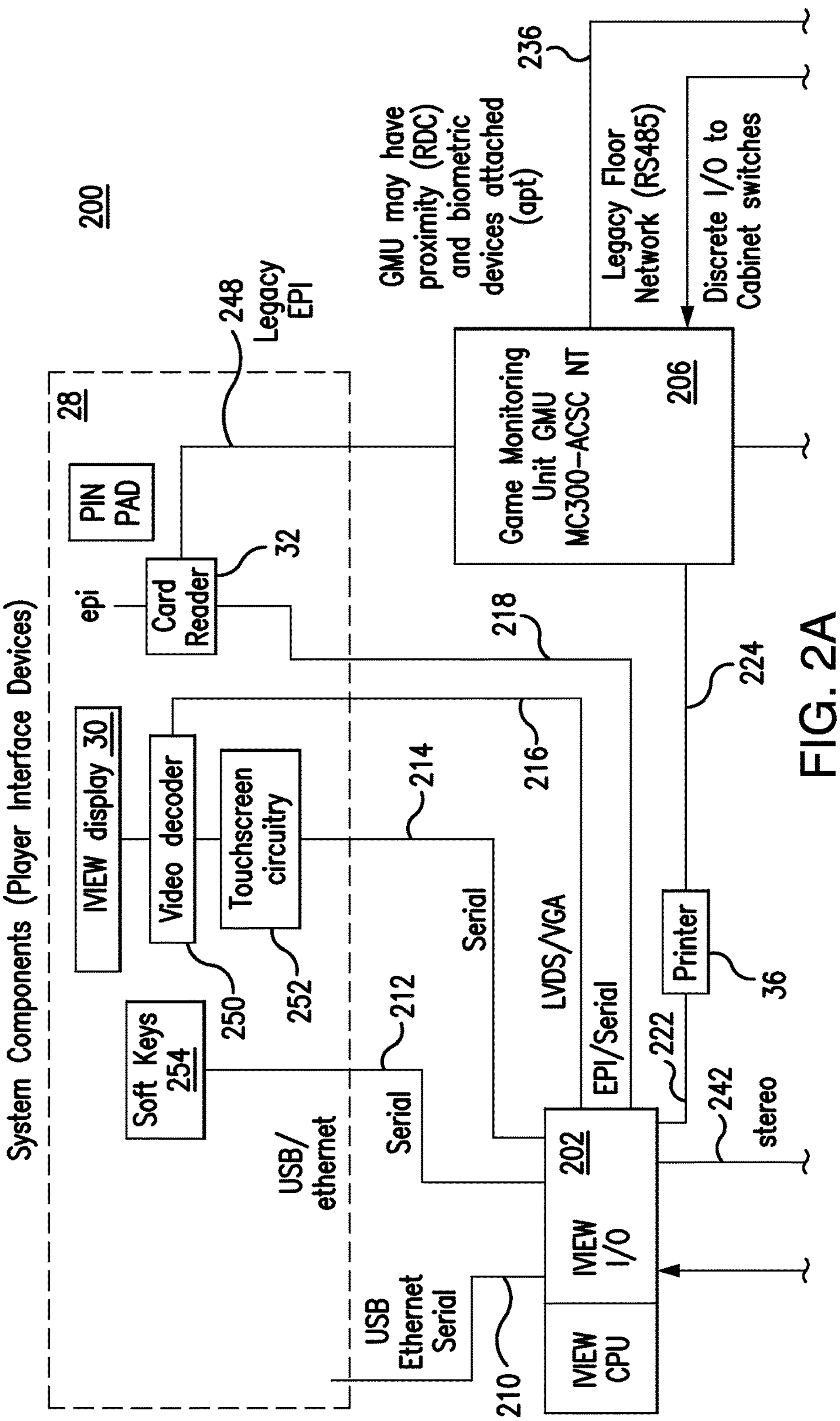
FIGS. 2A-2B illustrate an example of a gaming device operational platform and components for a gaming terminal of the type of the present invention.
Figure 2B:
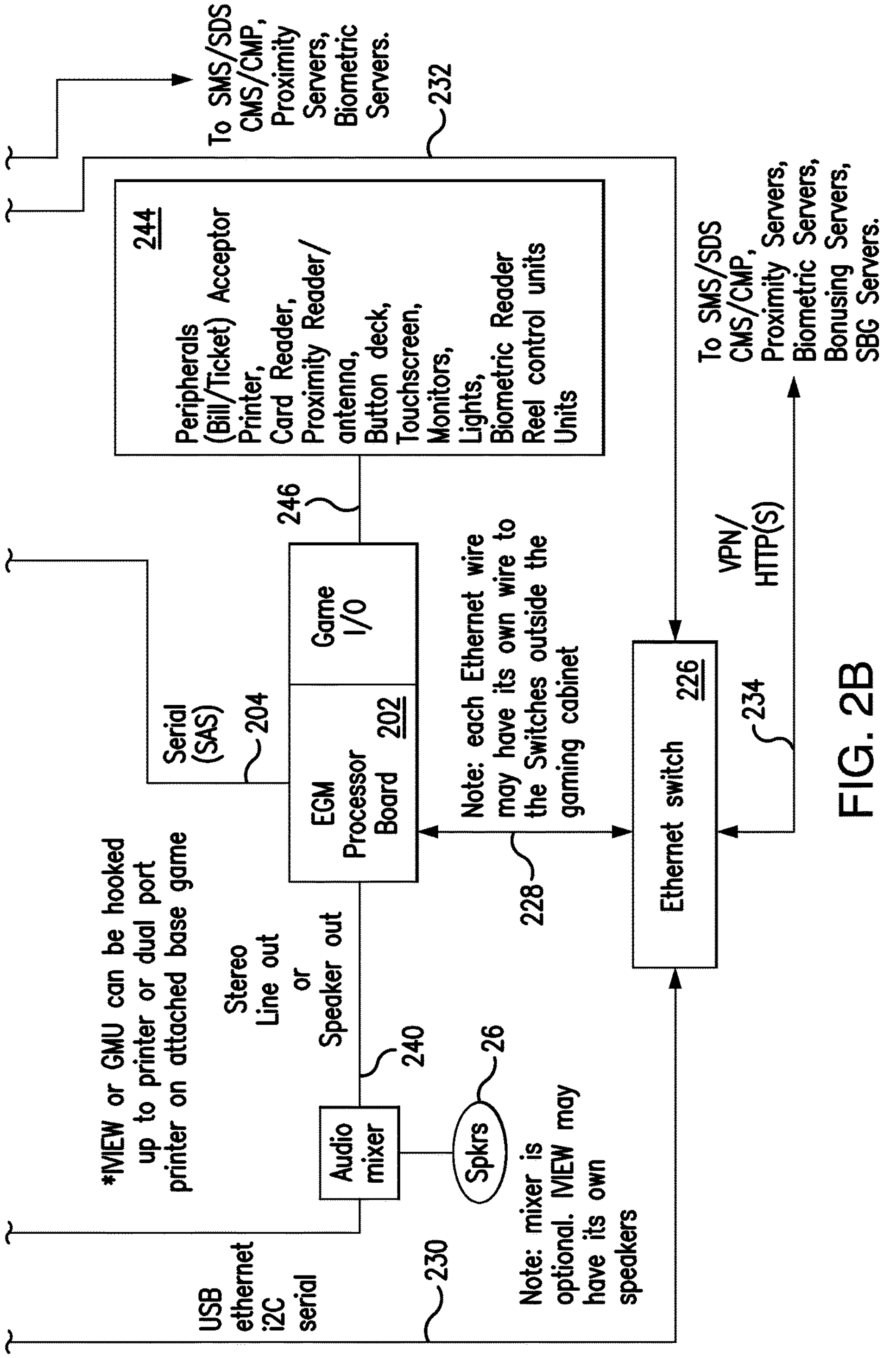

Referring to FIGS. 2A, B, the gaming device 10 hardware 200 for the controller(s) is shown in accordance with one or more embodiments. The hardware 200 includes game processor board (EGM Processor Board 202), sometimes referred to herein as the game CPU or game processor, connected through serial bus line 204 to game monitoring unit (GMU) 206 (such as a Bally MC300 or ACSC NT manufactured and sold by Bally Gaming, Inc., Las Vegas, Nev.), and player interface CPU/input-output device (EGM processor board 202) connected to the player tracking module (PTM) 28 over bus lines 210, 212, 214, 216, 218. The game processor board 202 includes one or more processors and memory devices for the control of inputs and outputs to operate the game. At least one processor is configured to access one or memory devices to control the video content displayed at the one or more displays such as the primary and secondary displays 14, 18.

The PTM 28 provides for communication between one or more gaming devices 10 and the casino system such as the type as hereinafter described. Inasmuch as gaming devices 10 may be manufactured by different entities, mounting like PTMs 28 at each gaming device 10 provides for communication to the system in one or more common message protocols. Typically when a casino enterprise purchases a casino management system they also purchase the same manufacturer's PTMs 28 and video switcher and touch router such as a DM (Display Manager) device or the type sold by Bally Gaming, Inc. of Las Vegas, Nev. which are then installed by the various manufacturers of the gaming devices 10 before delivery. In this manner the mountings for the PTMs 28 on the gaming devices can be configured for location and esthetic appearance. Gaming voucher ticket printer 36 (for printing player cash out tickets) is connected to IVIEW I/O 208 and GMU 206 over bus lines 222, 224. EGM Processor Board 202, CPU 202, and GMU 206 connect to Ethernet switch 226 over bus lines 228, 230, 232. Ethernet switch 226 connects to a slot management system and a casino management system (SMS, SDS, CMS and CMP) (FIGS. 4A, 4B) network over bus line 234. Ethernet switch 226 may also connect to a server based gaming server or a downloadable gaming server. GMU 206 also may connect to the network over bus line 236. Speakers 26 to produce sounds related to the game or according to the present invention connect through audio mixer and bus lines 240, 242 to EGM Processor Board 202 and PIB 208.

Peripherals 244 connect through bus 246 to EGM Processor Board 202. The peripherals 244 include, but are not limited to the following and may include individual processing capability: bill/voucher acceptor 24 to validate and accept currency and ticket vouchers, the player interfaces such a buttons 20. The peripherals 244 may include the primary game display 14, secondary game display 18 and other displays such as, for example a tertiary video display or touch screen button panel video display as described above. The bill/voucher acceptor 24 is typically connected to the game input-output board of the EGM processing board 202 (which is, in turn, connected to a conventional central processing unit ("CPU") board), such as an Intel Pentium® microprocessor mounted on a gaming motherboard. The I/O board may be connected to CPU processor board by a serial connection such as RS-232 or USB or may be attached to the processor by a bus such as, but not limited to, an ISA bus. The I/O board and/or EGM processing board 202 include outputs for directing processed video content output to the correct display. Intervening graphics processing may also be included. Again these outputs are typically suitable wired connections. The gaming motherboard may be mounted with other conventional components, such as are found on conventional personal computer motherboards, and loaded with a game program which may include a gaming machine operating system (OS), such as a Bally Alpha OS. EGM processor board 202 executes a game program that causes the gaming device 10 to display at the plural displays and play a game. The various components and included devices may be installed with conventionally and/or commercially available components, devices, and circuitry into a conventional and/or commercially available gaming terminal cabinet 12.

When a player has inserted a form of currency such as, for example and without limitation, paper currency, coins or tokens, cashless tickets or vouchers, electronic funds transfers or the like into the currency acceptor, a signal is sent by way of bus 246 to the I/O board and to EGM processor board 202 which, in turn, assigns an appropriate number of credits for play in accordance with the game program. The player may further control the operation of the gaming machine by way of other peripherals 244, for example, to select the amount to wager via the buttons 20. The game starts in response to the player operating a start mechanism such as the handle 34, button 20 such as a SPIN/RESET button or a touch screen icon. The game program includes a random number generator to provide and display randomly selected video indicia at the primary game display 14 as shown in FIG. 1. In some embodiments, the random generator may be physically separate from gaming device 10; for example, it may be part of a central determination host system which provides random game outcomes to the game program. Finally, EGM processor board 202 under control of the game program and OS compares the outcome to an award schedule. The set of possible game outcomes may include a subset of outcomes related to the triggering and play of a feature or bonus game. In the event the displayed outcome is a member of this subset, EGM processor board 202, under control of the game program and by way of I/O Board, may cause feature game play to be presented on the primary game display 14 and/or any legacy secondary display(s) 18.

Video content and predetermined payout amounts for certain outcomes, including feature game outcomes, are stored as part of the game program. Such payout amounts are, in response to instructions from processor board 202, provided to the player in the form of coins, credits or currency via I/O board and a pay mechanism, which may be one or more of a credit meter, a coin hopper, a voucher printer, an electronic funds transfer protocol or any other payout means known or developed in the art.

In various embodiments, game programs (including video content for the plural displays) are stored in a memory device (not shown) connected to or mounted on the gaming motherboard. By way of example, but not by limitation, such memory devices include external memory devices, hard drives, CD-ROMs, DVDs, and flash memory cards. The memory device includes game programs for at least a base game including any associated bonus games. In an embodiment, as described below, the memory may also include a feature program. In an alternative embodiment, the game programs are stored in a remote storage device. In an embodiment, the remote storage device is housed in a remote server such as a downloadable gaming server. The gaming device may access the remote storage device via a network connection, including but not limited to, a local area network connection, a TCP/IP connection, a wireless connection, or any other means for operatively networking components together. Optionally, other data including graphics, sound files and other media data for use with the gaming device are stored in the same or a separate memory device (not shown). Some or all of the game programs and its associated data may be loaded from one memory device into another, for example, from flash memory to random access memory (RAM).

In one or more embodiments, peripherals may be connected to the system over Ethernet connections directly to the appropriate server or tied to the system controller inside the gaming terminal using USB, serial or Ethernet connections. Each of the respective devices may have upgrades to their firmware utilizing these connections.

GMU 206 (Game Monitoring Unit) includes an integrated circuit board and GMU processor and memory including coding for network communications, such as the G2S (game-to-system) protocol from the Gaming Standards Association, Las Vegas, Nev., used for system communications over the network. As shown, GMU 206 may connect to the card reader 32 through bus 248 and may thereby obtain player information and transmit the information over the network through bus 236. Gaming activity information may be transferred by the EGM Processor Board 202 to GMU 206 where the information may be translated into a network protocol, such as S2S, for transmission to a server, such as a player tracking server, where information about a player's playing activity may be stored in a designated server database.

PIB 208 includes an integrated circuit board, PID processor, and memory which includes an operating system, such as Windows CE, a player interface program which may be executable by the PID 208 processor together with various input/output (I/O) drivers for respective devices which connect to PID 208, such as player tracking module 28, and which may further include various games or game components playable on PID 208 or playable on a connected network server and IVIEW 208 is operable as the player interface. PID 208 connects to card reader 32 through bus 218, player tracking display 30 through video decoder 250 and bus 216, such as an LVDS or VGA bus.

As part of its programming, the PID 208 processor executes coding to drive player tracking display 30 and provide messages and information to a player. Touch screen circuitry 252 interactively connects PTM display 30 and video decoder 250 to PID 208 such that a player may input information and causes the information to be transmitted to PID 208 either on the player's initiative or responsive to a query by PID 208. Additionally soft keys 254 connect through bus 212 to PID 208 and operate together with the player tracking display 30 to provide information or queries to a player and receive responses or queries from the player. PID 208, in turn, communicates over the CMS/SMS network through Ethernet switch 226 and busses 230, 234 and with respective servers, such as a player tracking server.

PTMs 28 are linked into the virtual private network of the system components in gaming device 10. The system components include the player tacking module 28 (e.g. Bally iVIEW® device) ('iView" is a registered trademark of Bally Gaming, Inc.) EGM processing board 202 and game monitoring unit (GMU) processing board 206. These system components may connect over a network to the slot management system (such as a commercially available Bally SDS/SMS) and/or casino management system (such as a commercially available Bally CMP/CMS).

The GMU 206 system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to installation on the system components.

The system components include the PTM 28 processing board and game monitoring unit (GMU) 206. The GMU 206 and PTM 28 can be combined into one like the commercially available Bally G™ iVIEW device. This device may have a video mixing technology to mix the EGM processor's video signals with the iVIEW display onto the top box monitor or any monitor on the gaming device.

The PTM 28 may also interface with a switcher and router device of the type described in Kelly et al U.S. Pat. No. 8,241,123 issued Aug. 14, 2012 and entitled "Video Switcher and Touch Router Method for a Gaming Machine" the disclosure of which is incorporated by reference. Instead of providing the PTM display 30, the switcher and router device (e.g. DM) provides for the content normally display at the PTM display 30 to be displayed at and share display real estate with one or more of the primary or secondary displays 14, 18.

Figure 3:
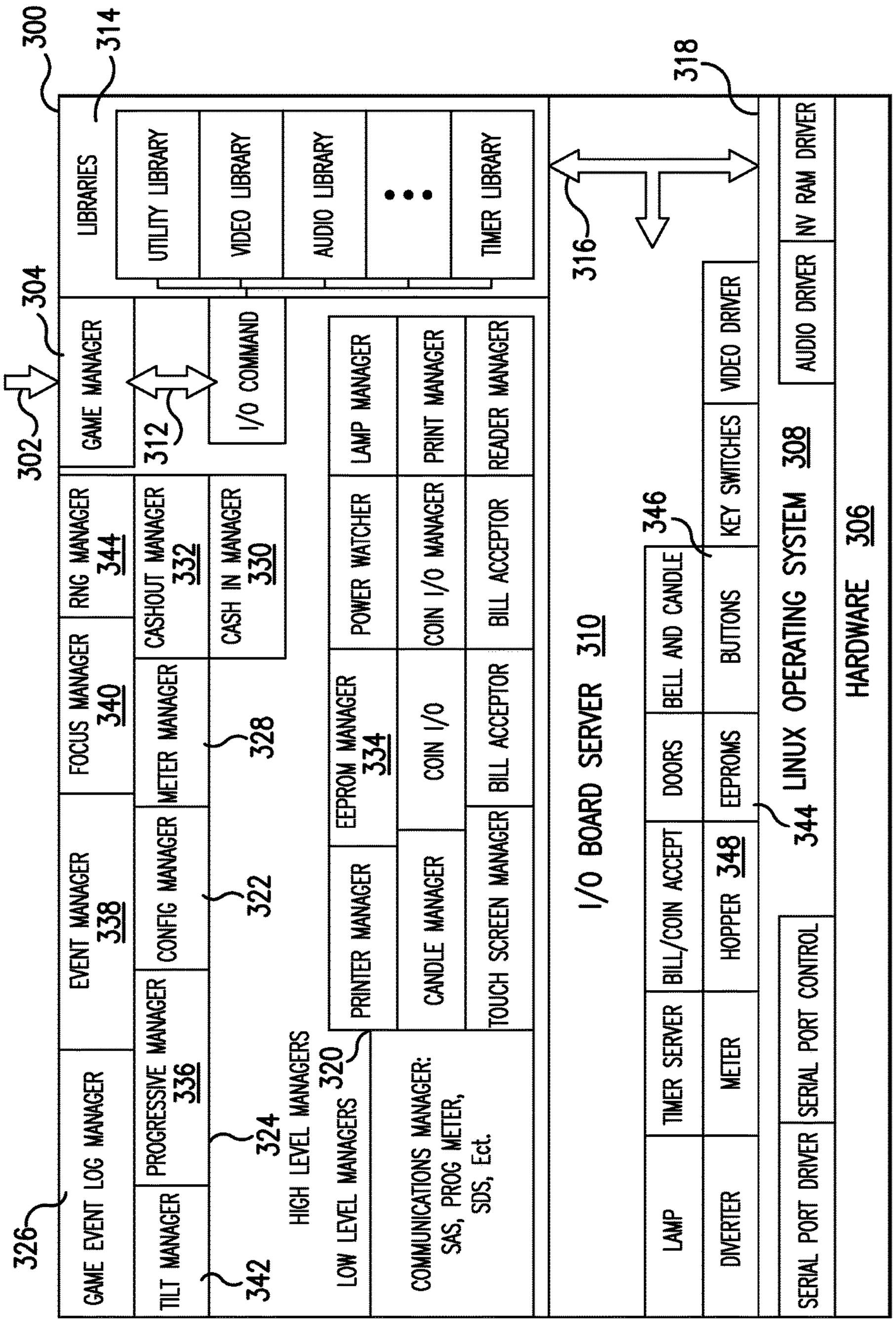
FIG. 3 is a block diagram of the logical components of a gaming kernel for a gaming device.

In accordance with one or more embodiments, FIG. 3 is a functional block diagram of a gaming kernel 300 of a game program under control of EGM processor board 202. The game program uses gaming kernel 300 by calling into application programming interface (API) 302, which is part of game manager 304. The components of game kernel 300 as shown in FIG. 3 are only illustrative, and should not be considered limiting. For example, the number of managers may be changed, additional managers may be added or some managers may be removed without deviating from the scope and spirit of the invention.

As shown in the example, there are three layers: a hardware layer 306; an operating system layer 308, such as, but not limited to, Linux; and a game kernel layer having game manager 304 therein. In one or more embodiments, the use of an operating system layer 308, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel 300 executes at the user level of the operating system layer 308, and itself contains a major component called the I/O board server 310. To properly set the bounds of game application software (making integrity checking easier), all game applications interact with gaming kernel 300 using a single API 302 in game manager 304. This enables game applications to make use of a well-defined, consistent interface, as well as making access points to gaming kernel 300 controlled, where overall access is controlled using separate processes.

For example, game manager 304 parses an incoming command stream and, when a command dealing with I/O comes in (arrow 312), the command is sent to an applicable library routine 314. Library routine 314 decides what it needs from a device, and sends commands to I/O board server 310 (see arrow 316). A few specific drivers remain in operating system layer 308's kernel, shown as those below line 318. These are built-in, primitive, or privileged drivers that are (i) general (ii) kept to a minimum and (iii) are easier to leave than extract. In such cases, the low-level communications is handled within operating system layer 308 and the contents passed to library routines 314.

Thus, in a few cases library routines may interact with drivers inside operating system layer 308, which is why arrow 316 is shown as having three directions (between library routines 314 and I/O board server 310, or between library routines 314 and certain drivers in operating system layer 308). No matter which path is taken, the logic needed to work with each device is coded into modules in the user layer of the diagram. Operating board server 310 layer is kept as simple, stripped down, and common across as many hardware platforms as possible. The library utilities and user-level drivers change as dictated by the game cabinet or game machine in which it will run. Thus, each game cabinet or game machine may have an industry standard EGM processing board 202 connected to a unique, relatively dumb, and as inexpensive as possible I/O adapter board, plus a gaming kernel 300 which will have the game-machine-unique library routines and I/O board server 310 components needed to enable game applications to interact with the gaming machine cabinet. Note that these differences are invisible to the game application software with the exception of certain functional differences (i.e., if a gaming cabinet has stereo sound, the game application will be able make use of API 302 to use the capability over that of a cabinet having traditional monaural sound).

Game manager 304 provides an interface into game kernel 300, providing consistent, predictable, and backwards compatible calling methods, syntax, and capabilities by way of game application API 302. This enables the game developer to be free of dealing directly with the hardware, including the freedom to not have to deal with low-level drivers as well as the freedom to not have to program lower level managers 320, although lower level managers 320 may be accessible through game manager 304's interface if a programmer has the need. In addition to the freedom derived from not having to deal with the hardware level drivers and the freedom of having consistent, callable, object-oriented interfaces to software managers of those components (drivers), game manager 304 provides access to a set of high level managers 324 also having the advantages of consistent callable, object-oriented interfaces, and further providing the types and kinds of base functionality required in casino-type games. Game manager 304, providing all the advantages of its consistent and richly functional game application API 302 as supported by the rest of game kernel 300, thus provides a game developer with a multitude of advantages.

Game manager 304 may have several objects within itself, including an initialization object (not shown). The initialization object performs the initialization of the entire game machine, including other objects, after game manager 304 has started its internal objects and servers in appropriate order. In order to carry out this function, the kernel's configuration manager 322 is among the first objects to be started; configuration manager 322 has data needed to initialize and correctly configure other objects or servers.

The upper level managers 324 of game kernel 300 may include game event log manager 326 which provides, at the least, a logging or logger base class, enabling other logging objects to be derived from this base object. The logger object is a generic logger; that is, it is not aware of the contents of logged messages and events. The game event log manager's 326 job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 328 manages the various meters embodied in the game kernel 300. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 328 receives its initialization data for the meters, during start-up, from configuration manager 322. While running, the cash in manager 330 and cash out manager 332 call the meter manager's 328 update functions to update the meters. Meter manager 328 will, on occasion, create backup copies of the soft meters by storing the soft meters' readings in EEPROM. This is accomplished by calling and using EEPROM manager 334.

In accordance with still other embodiments, progressive manager 336 manages progressive games playable from the game machine. Thus where the progressive is a WAN-based progressive the progressive controller 2000 may be incorporated into the progressive manager 336. Event manager 338 is generic, like game event log manager 326, and is used to manage various gaming machine events. Focus manager 340 correlates which process has control of various focus items. Tilt manager 342 is an object that receives a list of errors (if any) from configuration manager 322 at initialization, and during game play from processes, managers, drivers, etc. that may generate errors. Random number generator manager 344 is provided to allow easy programming access to a random number generator (RNG), as a RNG is required in virtually all casino-style (gambling) games. Random number generator manager 344 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 332 has the responsibility of configuring and managing monetary output devices. During initialization, cash out manager 332, using data from configuration manager 322, sets the cash out devices correctly and selects any selectable cash out denominations. During play, a game application may post a cash out event through the event manager 338 (the same way all events are handled), and using a call back posted by cash out manager 332, cash out manager 332 is informed of the event. Cash out manager 332 updates the credit object, updates its state in non-volatile memory, and sends an appropriate control message to the device manager that corresponds to the dispensing device. As the device dispenses dispensable media, there will typically be event messages being sent back and forth between the device and cash out manager 332 until the dispensing finishes, after which cash out manager 332, having updated the credit manager and any other game state (such as some associated with meter manager 328) that needs to be updated for this set of actions, sends a cash out completion event to event manager 338 and to the game application thereby. Cash in manager 330 functions similarly to cash out manager 332, only controlling, interfacing with, and taking care of actions associated with cashing in events, cash in devices, and associated meters and crediting.

In a further example, in accordance with one or more embodiments, I/O board server 310 may write data to the gaming machine EEPROM memory, which is located in the gaming machine cabinet and holds meter storage that must be kept even in the event of power failure. Game manager 304 calls the I/O library functions to write data to the EEPROM. The I/O board server 310 receives the request and starts a low priority EEPROM manager 334 thread within I/O board server 310 to write the data. This thread uses a sequence of 8 bit command and data writes to the EEPROM device to write the appropriate data in the proper location within the device. Any errors detected will be sent as IPC messages to game manager 304. All of this processing is asynchronous.

In accordance with one embodiment, button module 346 within I/O board server 310, polls (or is sent) the state of buttons every 2 ms. These inputs are debounced by keeping a history of input samples. Certain sequences of samples are required to detect a button was pressed, in which case the I/O board server 310 sends an inter-process communication event to game manager 304 that a button was pressed or released. In some embodiments, the gaming machine may have intelligent distributed I/O which debounces the buttons, in which case button module 346 may be able to communicate with the remote intelligent button processor to get the button events and simply relay them to game manager 304 via IPC messages. In still another embodiment, the I/O library may be used for pay out requests from the game application. For example, hopper module 348 must start the hopper motor, constantly monitor the coin sensing lines of the hopper, debounce them, and send an IPC message to the game manager 304 when each coin is paid.

Further details, including disclosure of lower level fault handling and/or processing, are included in U.S. Pat. No. 7,351,151 issued Apr. 1, 2008 entitled "Gaming Board Set and Gaming Kernel for Game Cabinets" the disclosure of which is incorporated herein by explicit reference.

Figure 4A:
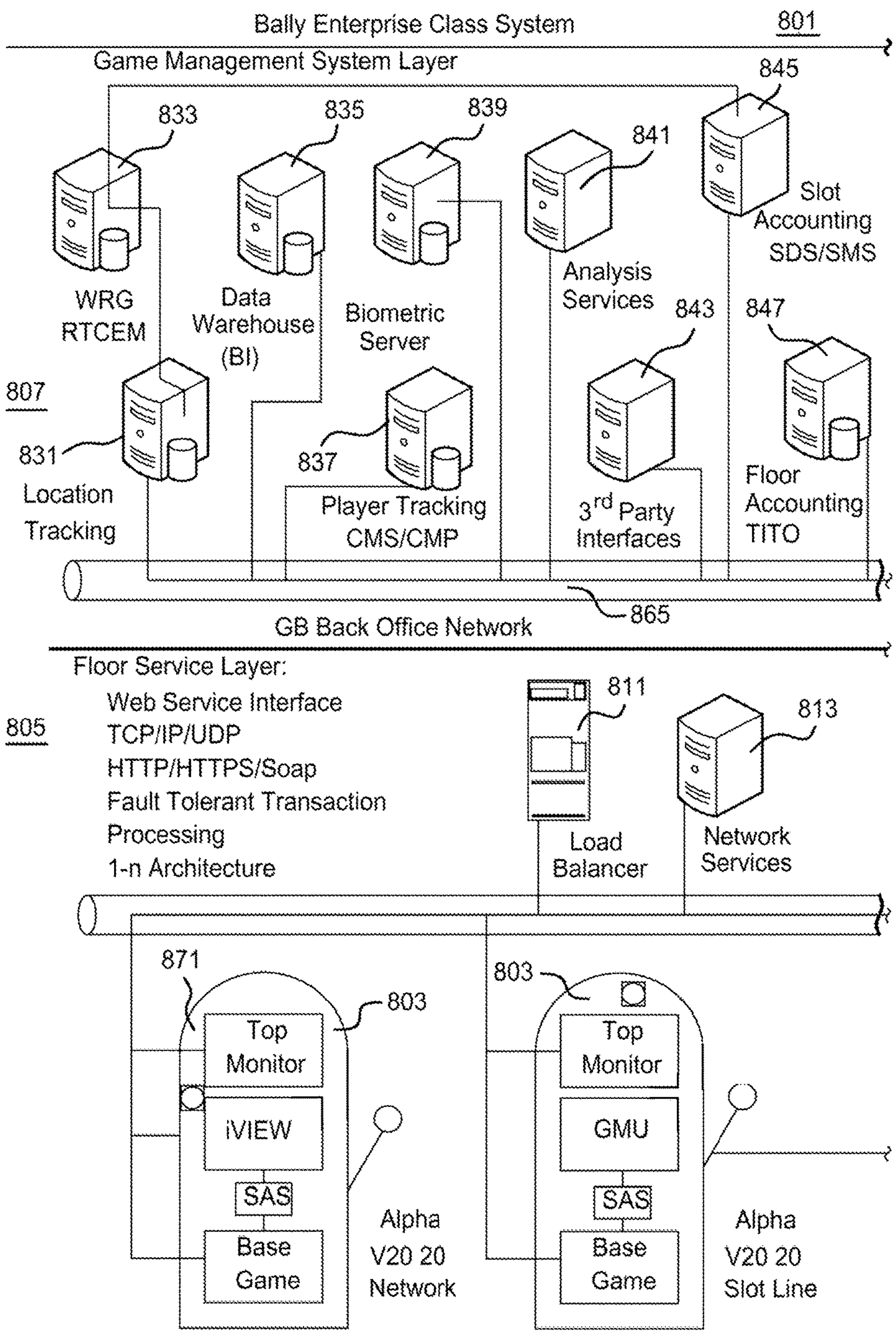
FIGS. 4A and 4B is a schematic of an example of a casino enterprise network incorporating gaming devices.
Figure 4B:
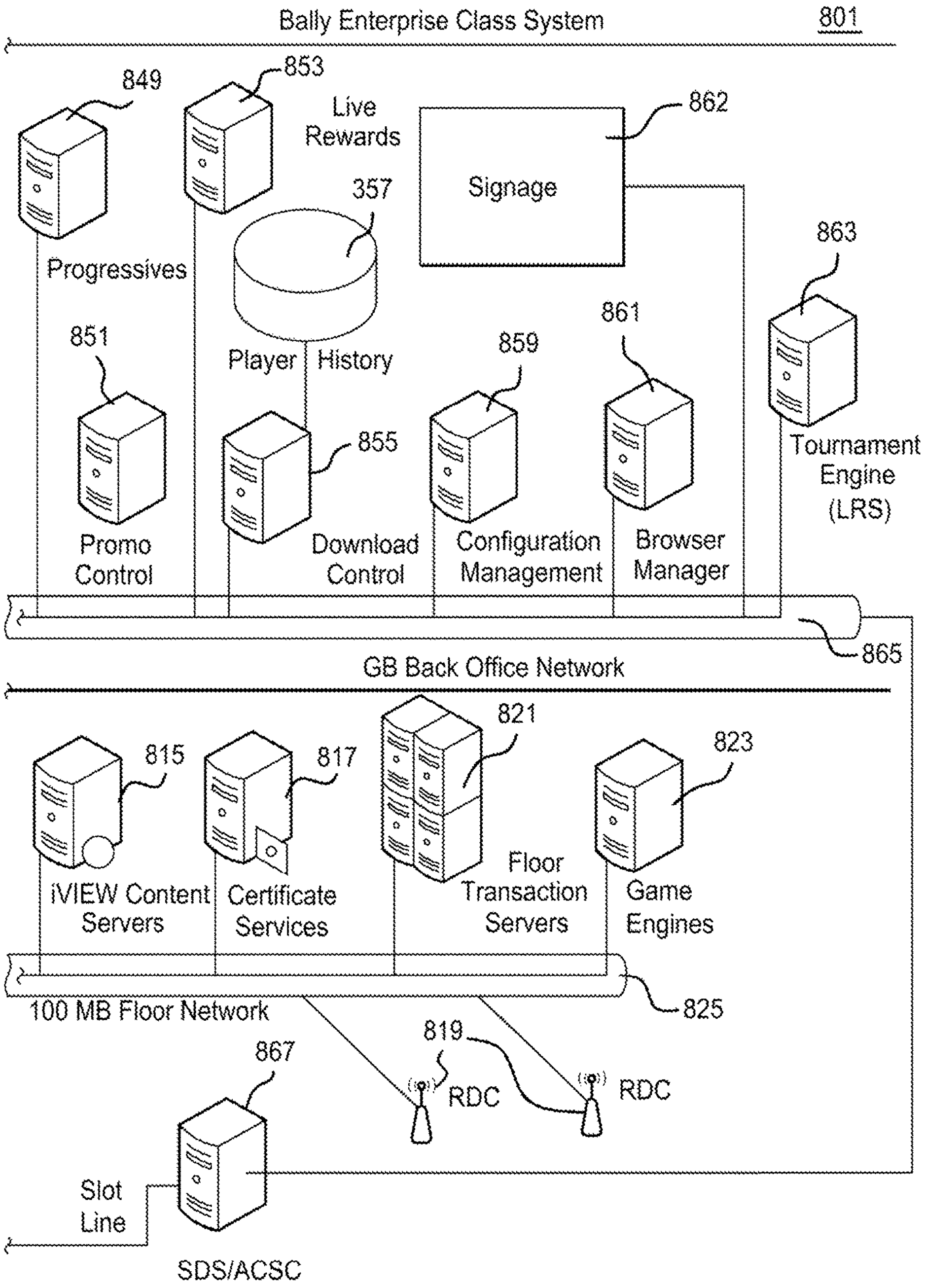

Referring to FIGS. 4A and B, an example of a gaming system 801 is shown in accordance with one or more embodiments. Gaming system 801 may include one casino or multiple locations (herein referred to collectively as a casino enterprise) and generally includes a network of gaming devices 803 (including gaming devices 10 of the type as described in FIG. 1), floor management system (SMS) 805, and casino management system (CMS) 807. SMS 805 may include load balancer 811, network services server 813, player tracking module 28, iView (PTM 28) content servers 815, certificate services server 817, floor radio dispatch receiver/transmitters (RDC) 819, floor transaction servers 821 and game engines 823 (where the gaming devices 803 operate server based or downloadable games), each of which may connect over network bus 825 to gaming devices 803. CMS 807 may include location tracking server 831, WRG RTCEM (William Ryan Group Real Time Customer Experience Management from William Ryan Group, Inc. of Sea Girt, N.J.) server 833, data warehouse server 835, player tracking server 837, biometric server 839, analysis services server 841, third party interface server 843, slot accounting server 845, floor accounting server 847, progressives server 849, promo control server 851, bonus game (such as Bally Live Rewards) server 853, download control server 855, player history database 857, configuration management server 859, browser manager 861, tournament engine server 863 connecting through bus 865 to server host 867 and gaming devices 803. In an embodiment the progressive feature according to the various embodiments of the present invention may be configured and controlled by the progressive server 849. The various servers and gaming devices 803 may connect to the network with various conventional network connections (such as, for example, USB, serial, parallel, RS485, Ethernet). Additional servers which may be incorporated with CMS 807 include a responsible gaming limit server (not shown), advertisement server (not shown), and a control station server (not shown) where an operator or authorized personnel may select options and input new programming to adjust each of the respective servers and gaming devices 803. SMS 805 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

The gaming devices 803 include various peripheral components that may be connected with USB, serial, parallel, RS-485 or Ethernet devices/architectures to the system components within the respective gaming machine. The GMU 507 (shown as GMU 206 in FIG. 2A) has a connection to the base game through a serial SAS connection. The system components in the gaming cabinet may be connected to the servers using HTTPs or G2S protocols over Ethernet. Using CMS 807 and/or SMS 805 servers and devices, firmware, media, operating systems, and configurations may be downloaded to the system components of respective gaming devices for upgrading or managing floor content and offerings in accordance with operator selections or automatically depending upon CMS 807 and SMS 805 master programming. The data and programming updates to gaming devices 803 are authenticated using conventional techniques prior to install on the system components.

In various embodiments, any of the gaming devices 803 may be a mechanical reel spinning slot machine, video slot machine, video poker machine, video Bingo machine, Keno machine, or a gaming device offering one or more of the above described games including an interactive wheel feature. Alternately, gaming devices 803 may provide a game with an accumulation-style feature game as one of a set of multiple primary games selected for play by a random number generator, as described above. A gaming system 801 of the type described above also allows a plurality of games in accordance with the various embodiments of the invention to be linked under the control of a group game server (not shown) for cooperative or competitive play in a particular area, carousel, casino or between casinos located in geographically separate areas. For example, one or more examples of group games under control of a group game server are disclosed in U.S. Published Application 2008/0139305, entitled "Networked System and Method for Group Gaming," filed on Nov. 9, 2007, which is hereby incorporated by reference in its entirety for all purposes.

The gaming system 801, among other functionalities such as slot accounting (i.e. monitoring the amount wagered ("drop"), awards paid) and other casino services, includes the player tracking CMS/CMP server 837 and/or data warehouse 835 storing player account data. This data includes personal data for players enrolled in the casino players club sometimes referred to as a loyalty club. An example of the personal data is the player's name, address, SSN, birth date, spouse's name and perhaps personal preferences such as types of games, preferences regarding promotions, player rating level, available player comp points (points accumulated based upon commercial "spend" activity with the enterprise including gaming and which may be redeemed or converted into cash or merchandise) and the like. As is known in the industry and according to the prior art, at enrolment the player is assigned a created account in the player tracking CMS/CMP server 837 and is issued a player tracking card having a machine readable magnetic stripe.

The system 801 may also include electronic transfer of funds functionality. For example, a player having accumulated $100 at a gaming terminal 10 may decide to "cash out" to play another gaming device 10. The player, for example using the PTM 28 to initiate communication with the system 801 for example server 837 to upload the value from the gaming terminal 10 into an electronic account associated with the player's account. The player may choose to upload all or a portion of the funds the player's established electronic account. The system would prompt the player to enter their PIN (or obtain biometrical confirmation as to the player's identity) and upload the chosen amount to their account. When the player moves to another gaming terminal 10 he/she inserts their player loyalty card into the card reader 32 to access their account. A prompt provides for the player to request funds from their account. Entering their PIN (or biometric identifier) the player can input the desired amount which is downloaded to their gaming terminal 10 for play.

Figure 5:
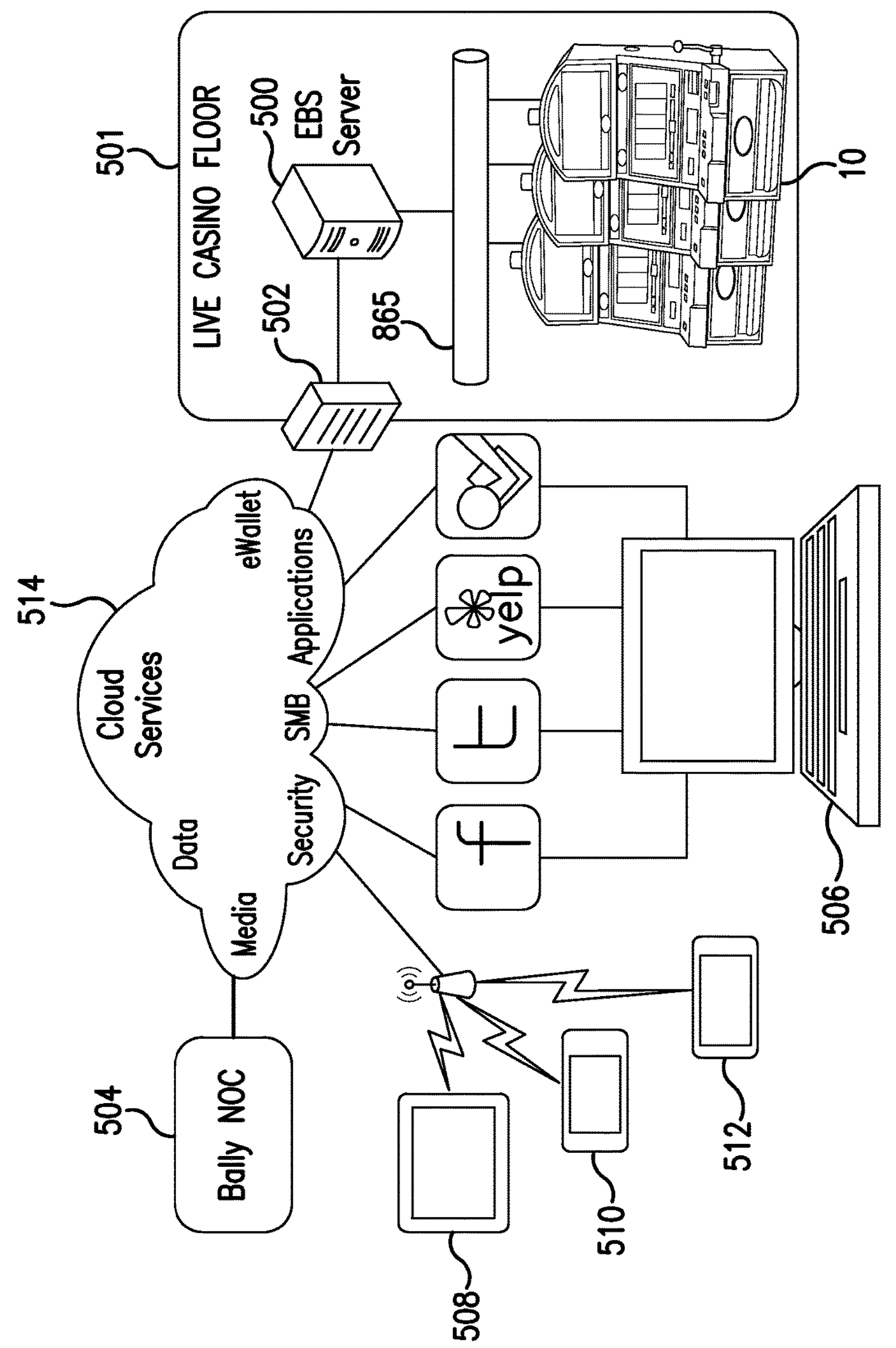
FIG. 5 is a diagram showing an example of an architecture for tying a casino enterprise network to an external provider of games and content to Internet or broadband communication capable devices.

Various embodiments of the present invention may be implemented or promoted by or through a system as suggested in FIG. 5. At 501 is the gaming enterprise system which may be hosted at a casino property enterprise, across several casino enterprises or by a third party host. As described above the gaming enterprise system 501 has a network communication bus 865 providing for communication between the gaming devices 10 and various servers as described above with respect to FIGS. 4A,B. To provide the functionality illustrated in FIG. 5, a feature server 500, such as a Bally Elite Bonusing Server, is connected to the network communication bus 865 for communication to the gaming system 801, the gaming devices 10 and the various servers and other devices as described above. Through a secure network firewall 502 the feature server 500 is in communication with a cloud computing/storage service 514 which may be hosted by the casino enterprise, a licensed third party or if permitted by gaming regulators an unlicensed provider. For example the cloud service 514 may be as provided by Microsoft® Private Cloud Solutions offered by Microsoft Corp. of Redmond, Wash., USA. The cloud service 514 provides various applications which can be accessed and delivered to, for example, personal computers 506, portable computing devices such as computer tablets 508, personal digital assistants (PDAs) 510 and cellular devices such as telephones and smart phones 512. For example the cloud service 514 may provide and support the enterprise applications in association with the feature server 500. The cloud service 513 may also facilitate the delivery of content to user/players by supporting updates and advertising through the enterprise applications to the remote device user/player. The cloud service 514 includes security provide for secure communication with the cloud service 514 between the player/users and the cloud service 514 and between the cloud service 514 and the gaming enterprise system 501. Security applications may be through encryption, the use of personal identification numbers (PINS), biometric identification, location determination or other devices and systems. As suggested in FIG. 5 the cloud service 515 stores or accesses player/user data retrieved from players/users and from the gaming enterprise system 501 and feature server 500.

The players/users may access the cloud service 514 and the applications and data provided thereby through the Internet or through broadband wireless cellular communication systems and any intervening sort range wireless communication such as Wi-Fi. The players/users may access the applications and data through various social media offerings such as Facebook, Twitter, Yelp, MySpace or LinkedIn or the like.

The cloud service 514 may also host game applications to provide virtual instances of games and features, such as described herein, for free, promotional, or where permitted, P2P (Pay to Play) supported gaming. Third party developers may also have access to placing applications with the cloud service 514 through, for example a national operations center (Bally NOC 504). A game software manufacturer such as Bally Gaming, Inc. may also provide game applications on its own or on behalf of the casino enterprise.

Other media such as advertising, notices (such as an upcoming tournament) promotions and surveys may also be provided to and through the cloud service 514. When a player/user accesses the cloud service 514 certain media may be delivered to the player/user in a manner formatted for their application and device.

The cloud service 514 enables the casino enterprise to provide base games and features and to market to and foster player loyalty. To drive such interaction various incentive programs may be employed including, as described above, users earning or being awarded mystery game chances which may be redeemed at their next visit to the casino enterprise or, where permitted, during play on their remote devices.

According to an embodiment of the present invention a plurality of progressive jackpot pool tiers are provided. For example progressive jackpot pools $PJ_N$, such as first progressive jackpot pool $PJ_1$ 602, a second progressive jackpot pool $PJ_2$, 604 and a third progressive jackpot pool $PJ_3$ 606 are defined, for example, at the WAN progressive server 849 (FIG. 4B) or at a progressive controller associated with a single gaming device 10 for operating stand-alone progressives, a bank controller for operating LAN based progressives. Where the gaming devices 10 are P2P devices the progressive jackpot pools $PJ_N$ are pools funded from the wagers associated with the play of at least the base game 600 such as by assigning a percentage of each qualifying base game wager to the pools. The contributions to each pool may be the same or different so that each grows at different rates or in an embodiment may be substantially equal. It should be understood that one or more of the progressive jackpot pools $PJ_N$ could be funded additionally or alternatively from other sources such marketing dollars (i.e. from the provider's revenue), third party funding or a combination of several of the foregoing sources. As but an example a casino enterprise may provide initial funding for progressive jackpot pools $PJ_N$ from marketing dollars and then "progress" the jackpots with both marketing and a share of the wagers from qualifying gaming devices 10. The progressive jackpot pools $PJ_N$ preferably have a starting, or minimum values and a maximum value. For example $PJ_1$, the lower tier or level progressive jackpot pool, may have a start value of $10 and a maximum value or $30 whereas the second tier progressive jackpot pool $PJ_2$ may have a minimum value of $35 and a maximum value of $50. A third tier or level of progressive jackpot pool $PJ_3$ may have a minimum value of $100 and a maximum value of $300. Where a percentage of the wagers are used to aggregate the progressive jackpot pools $PJ_N$ this percentage may include amounts necessary to seed the minimum starting values to the configured minimum values.

The progressive jackpot pools $PJ_N$ may also be a virtual value such as credits where the underlying play is not P2P, i.e. play for fun and not money. This virtual progressive jackpot pools could be increased based upon, for example, the amount of play, a percentage of virtual value wagered, time, advertising impressions delivered or the like.

Figure 7:
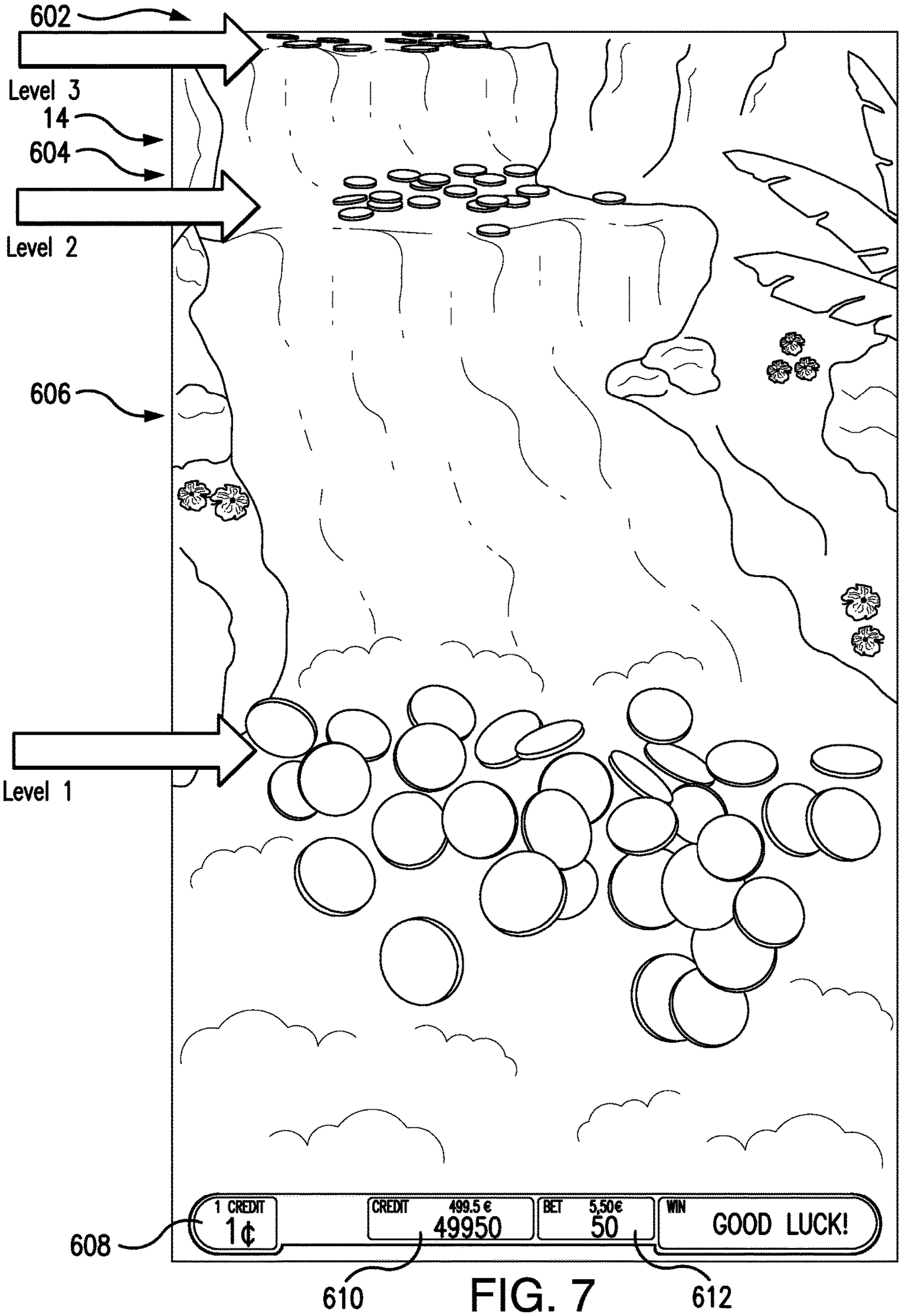
FIG. 7 shows the video display of FIG. 6 when all or a portion of a progressive jackpot pool is awarded to a player.

The progressive jackpot pools $PJ_N$ may be "stand-alone" progressives. This type of progressive is confined to a single gaming device 10. The progressive jackpot pools $PJ_N$ may be a LAN (local area network)-based progressive played among one or several banks of gaming devices 10. For example a LAN based progressive may link ten gaming devices 10 together to contribute to the progressive and to play for the progressive jackpot pools $PJ_N$. A LAN-based progressive typically includes a processor controlled local jackpot controller which amasses the progressive jackpot pool P, determines when an award of at least a portion of a progressive jackpot is triggered and determines the jackpot value PV to be awarded. Cava, US Pub App 2009/0117972 published May 7, 2009 and titled "Systems and/or Methods for Distributing Bonus Rewards Based on Accumulated Gaming Device Wins" the disclosure of which is incorporated by reference discloses a LAN-based jackpot controller. The progressive jackpot pools $PJ_N$ may also be a WAN (wide area)-based progressive for example linking all or many of the gaming devices 10 across one or more casino floors. Acres et al U.S. Reissued Pat. RE38,812 incorporated by reference discloses an example of a WAN-based (sometimes referred to herein as a systems-based) progressive jackpot. For wager-funded progressives it can be appreciated that LAN and WAN based progressives grow faster since there are many contributors. In such an event the start and maximum jackpot pool values can be set high. To support the LAN or WAN shared video displays may display the various tiers of the progressive jackpots $PJ_N$ such as indicated in FIG. 7 to create excitement and interest in the game.

None, some or all of one or more a progressive jackpot pools $PJ_N$ is/are awarded upon satisfaction of a trigger condition. As described below, in an embodiment some or all of pool may be awarded into a higher (or lower) level progressive jackpot pool and be accounted toward satisfying the triggering condition of the higher (or lower) level progressive jackpot pool. In an embodiment some of the pool may be awarded to the player upon satisfaction of a trigger condition and some may be awarded or moved into higher or lower level progressive jackpot. The trigger conditions for the progressive jackpot pools $PJ_N$ may be predefined, randomly defined or pseudo-randomly defined. According to the present invention and since the progressive prizes are "mystery" prizes, the triggers are not satisfied by any symbol combination on the base game. While base game symbol driven progressive jackpots are well known, inclusion of such progressives must be accounted for in the base game math. Thus such progressive jackpots cannot be added to base games without (1) reconfiguring the base game to account for the odds of a symbol combination triggering the progressive and the theoretical payout or (2) requiring a separate progressive jackpot wager. Where the underlying games are played on a free, play for fun basis, reconfiguration of the base games is not required since there is there is no financial risk to the host associated with the free play.

Preferably the progressive jackpot triggers according to the present invention may be any mystery trigger conditions. For example, the trigger conditions may be nth coin-in triggers where when the contributions from the wagers cause the progressive jackpot pool to achieve a random trigger value, the jackpot is triggered. Acres et al U.S. Reissued Pat. RE38,812 incorporated by reference discloses such as type of trigger. The trigger may also be arranged to be a virtual lottery such as described in Olive, U.S. Pat. No. 7,108,603 issued Sep. 19, 2006 and titled "Slot Machine Game and System with Improved Jackpot Feature" and Torango, U.S. Pat. No. 6,592,460 issued Jul. 15, 2003 and titled "Progressive Wagering System" the disclosures of which are incorporated by reference.

The trigger may also be a random trigger where the odds of the trigger occurring increase from a minimum (e.g. start value) at $V_{Min}$ (odds still greater than 0) toward unity as the progressive jackpot value approaches a predefined $V_{Max}$. In this fashion the trigger is guaranteed to occur at a jackpot value not greater than $V_{Max}$.

Returning to gaming devices 10 generally it has been known to provide secondary feature games triggered by one or more predefined symbol-based outcomes during the base game. These features may be a set of free spins, free spins with a multiplier, free spins with an enhanced symbol set, a feature game such as a "pick 'em" game where the player picks one or more symbols to reveal a prize or any other secondary game. These features or secondary games have an expected value EV. Expected Value (EV)=wager×(expected (theoretical) win−expected loss). For example the EV for an award of 10 free spins at a 2× multiplier may have an EV of $15.75 based upon the architecture of the feature game (e.g. PAR (pay table and reel strips)). The player may not win the EV value or may win more than the EV.

Turning to FIGS. 6-14 the various embodiments of the present invention will be described. As shown in FIG. 6 the gaming device 10 video display 14 may show the video slot machine base game 600. This display shows a plurality of progressive jackpot pools $PJ_N$ such as three tiers or levels of progressive jackpot pools $PJ_3$ 602, $PJ_2$ 604 and $PJ_1$ 606 corresponding, respectively, to progressive jackpot pool levels 3, 2 and 1. To enhance the player's experience the display may be a 3D display such as described in Kelly et al, U.S. Pub. App. 2012/0172119 filed Dec. 5, 2011 and titled "Gaming System, method and Device for Generating Images Having a Parallax Effect Using Face Tracking" the disclosure of which is incorporated by reference. In an embodiment the progressive jackpot pools $PJ_N$ are set at ascending value amounts such that $0<PJ_3<PJ_2<PJ_1$. As an example the progressive jackpot pool values may be defined as follows: $\$10 \le PJ_3 \le \$30$, $\$50 \le PJ_2 \le \$100$ and $\$200 \le PJ_1 \le \$1000$. It should be understood that other progressive jackpot pool ranges could be selected. It should also be understood that the presentation of the progressive jackpots with reference to FIG. 6 could be reversed such that $0<PJ_1<PJ_2<PJ_3$. To provide to the player a graphic representation of the progressive jackpot pools the video display 14 may display the pools as an identifiable mass of objects arranged, for example, in association with a cascading waterfall having three, tiered, levels. The mass may be a mass of objects depicted as coins. In other embodiments the objects may be displayed as gold nuggets in a tiered sluice or as a mass of lava in dammed up tiers. Where coins are used the feature is somewhat reminiscent of the prior "Pusher" games. In this regard physics modelling software may be used to model the physics behind the pusher game movement of coins or other objects. This software may be PhysX (by NVIDIA of Santa Clara, Calif.) or Havok® (by Havok of Dublin, Ireland). Displayed below the base game 600 is an information bar displaying at 608 the games wager denomination, at 610 the number of credits available for wagering and at 612 the bet level. The player makes a wager to play the base game 600 (and any associated secondary game) as is known in the art.

Figure 9:
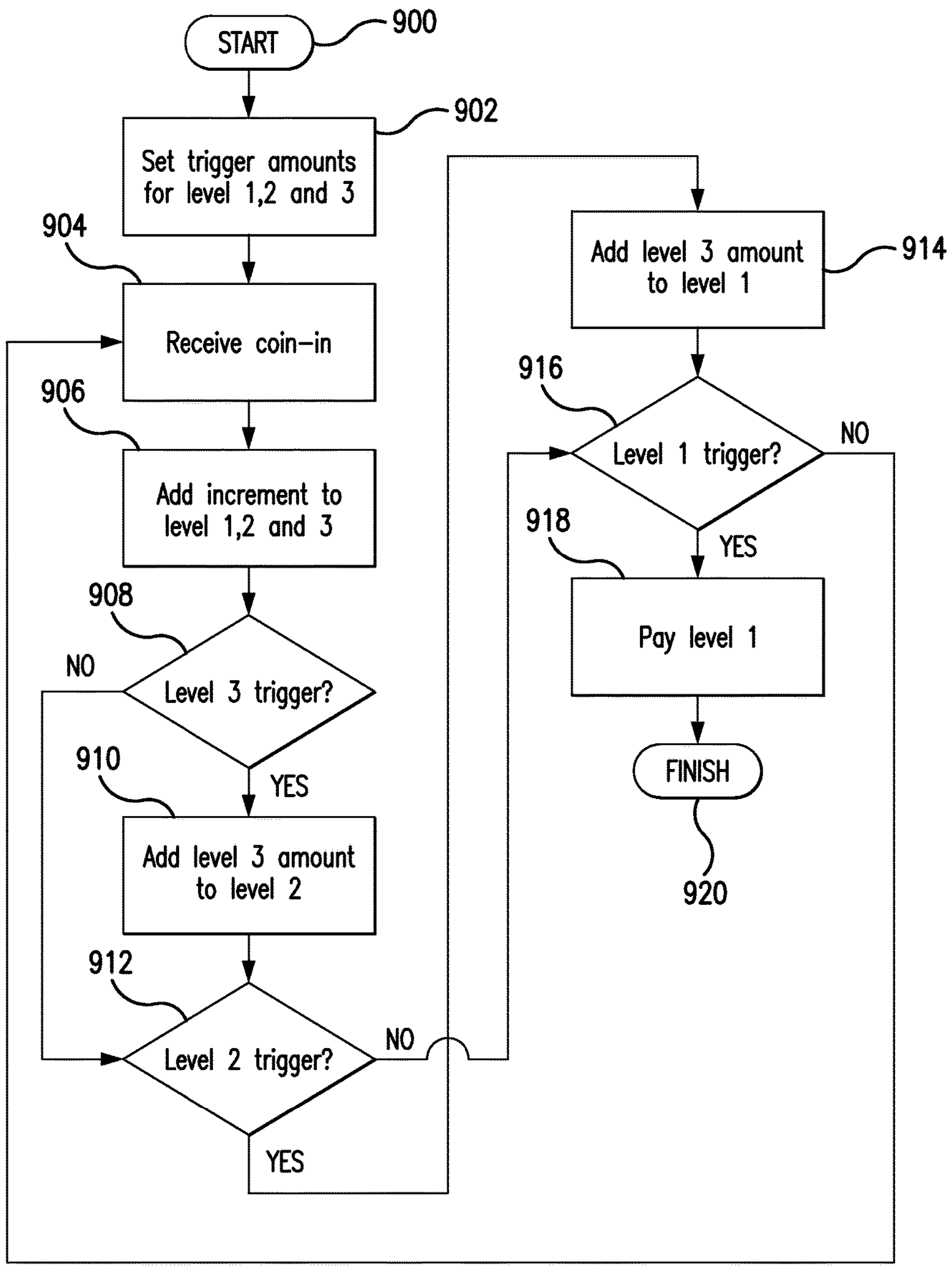
FIG. 9 is a logic diagram showing a process of an embodiment of the present invention for establishing the progressive jackpot pools and the testing for the occurrence of prize award trigger conditions.

The controller, such as the progressive server 846, is specially programmed, provisioned and configured to arrange the various progressive jackpots $PJ_N$ shown as $PJ_3$ 602, $PJ_2$ 604 and $PJ_1$ 606 as by setting their respective start or minimum values $V_{Min}$, maximum values $V_{Max}$, progressive contribution amounts and triggering criteria. As shown in FIG. 9 at 900 the progressive controller is initialized and at 902 triggering criteria such as triggering values are defined for each of $PJ_3$ 602, $PJ_2$ 604 and $PJ_1$ 606. In an embodiment the triggering values for each progressive pool are represented by a randomly selected value between their respective $V_{Min}$ and $V_{Max}$. The trigger values are re-selected after each trigger event. Other criteria may be used to define triggers for the pools $PJ_3$ 602, $PJ_2$ 604 and $PJ_1$ 606 and different types of triggers may be used. For example the triggers for $PJ_3$ 602 and $PJ_2$ 604 may be nth coin triggers whereas the trigger for $PJ_1$ 606 may be based upon the number of games played.

Figure 13:
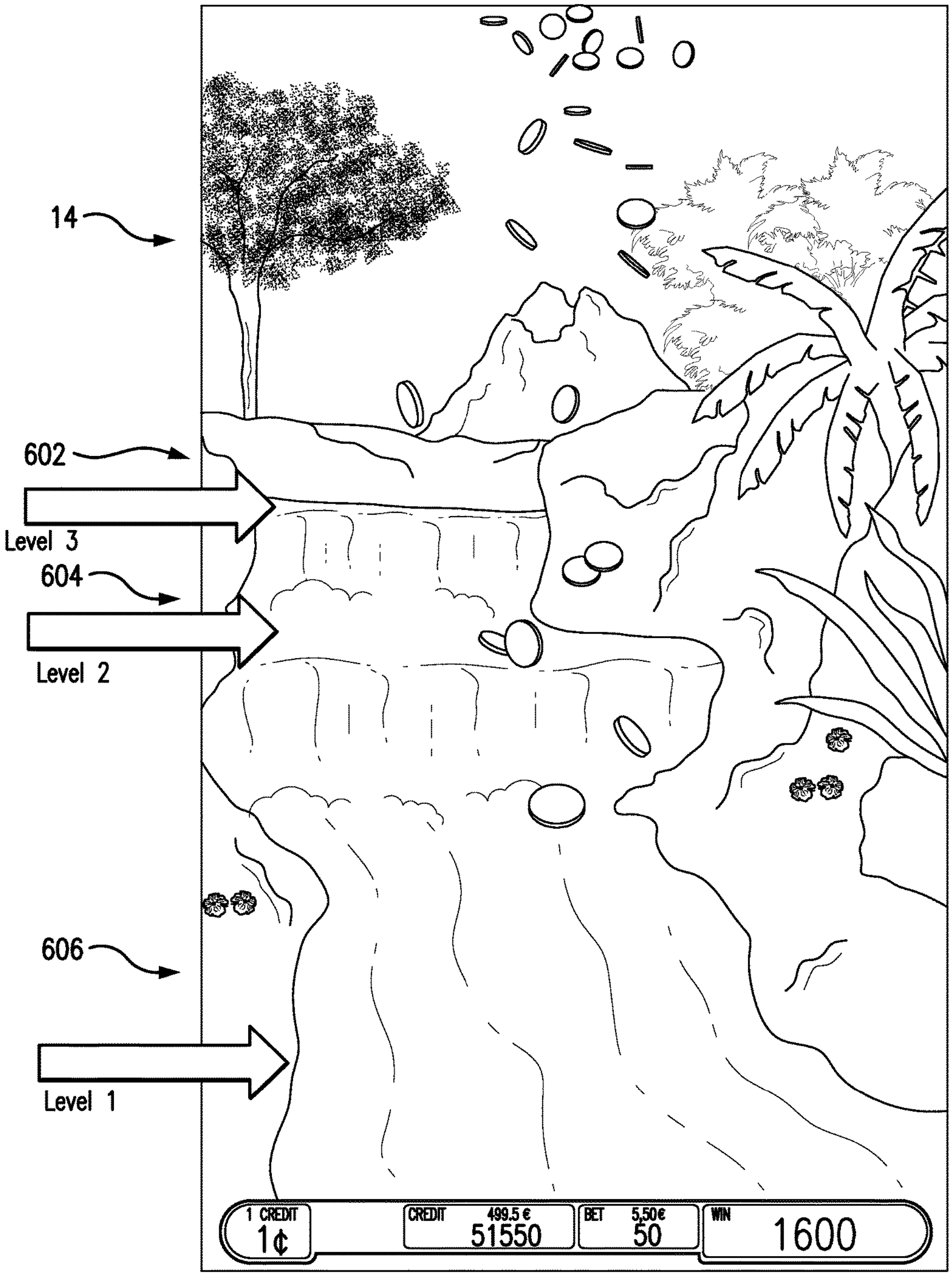
FIG. 13 shows the video display depicting contributions provided to one or more levels of the progressive jackpot pools.

At 904 the controller detects a qualifying wager for a base game and at 906 allocates a percentage of the wager to each progressive jackpot pool $PJ_3$ 602, $PJ_2$ 604 and $PJ_1$ 606 according to the predefined allocations. The allocated contributions need not be the same for all pools. Preferably, to generate player interest, the display 14 is controlled to display the mass associated with the pools $PJ_3$ 602, $PJ_2$ 604 and $PJ_1$606 to increase based upon the incremental allocations. For example, where the pools masses are displayed as coins, contributions may be represented as additional coins being added to the progressive levels. Physics modelling can be used to make the addition of coins to each pool and the resulting effect more realistic. Since the contributions may be fractions of a dollar the display may display a coin added to the level when a $1 incremental contribution has been achieved. As can be appreciated the players see the mass of coins growing toward an ultimate trigger value in anticipation of the triggering event. FIG. 13 depicts coins spewing from a volcano to populate the progressive jackpot levels. The pools may be incremented through other or additional events such as (a) when one or more predetermined symbol combinations occur in the base game one or more coins are added to one or more pools, (b) when a secondary game or feature game is triggered one or more coins are added to one or more pools, (c) gaming device turnover so that one or more coins are added to one or more pools based upon a proportion of the throughput or turnover at the gaming devices 10 or (d) a random contribution trigger such as for every 1¢ played there is a 0.001 chance of adding a coin to one or more pools.

The controller is configured at 908 to determine if the trigger criteria for $PJ_3$ 602 (the level three progressive jackpot pool) has been satisfied. If it has, in an embodiment, all of the then current value of $PJ_3$ 602 is pushed or moved into $PJ_2$ 604 (the level two progressive jackpot pool) at 910 and at 912 the controller is configured to determine if the trigger criteria for $PJ_2$ 604 has been satisfied. For example the pushing of the current value of $PJ_3$ 602 into $PJ_2$ 604 may cause the trigger criteria of $PJ_2$ 604 to be achieved. The value of $PJ_3$ 602 is reset to its start value $V_{Min}$ and a new trigger value is randomly selected. If the triggering criteria for $PJ_3$ 602 has not be satisfied its value is retained in $PJ_3$ 602 and the controller at 912 then determines if the trigger criteria for $PJ_2$ 604 has been satisfied in its own right and without any value contribution from $PJ_3$ 602 being rolled into $PJ_2$ 604.

If at 914 the trigger criteria for $PJ_2$ 604 has been satisfied the then current value of $PJ_2$ 604 is pushed into $PJ_1$ 606 to increase its value by the then current amount of $PJ_2$ 604 and at 916 the controller is configured to determine if the trigger criteria for $PJ_1$ 606 has now been satisfied. The value of $PJ_2$ 604 is reset to its start value $V_{Min}$ and a new trigger value is randomly selected. If the trigger value for $PJ_1$ 606 has satisfied by the pushing of $PJ_2$ 604 into $PJ_1$ 606 then at 918 at least the value of $PJ_1$ 606 is paid to the player. If at 912 the controller determines that the trigger condition for $PJ_2$ 604 has not been satisfied, at 916 the controller is configured to determine if the trigger criteria for $PJ_1$ 606 has been satisfied with no additional contribution from $PJ_2$ 604. If it is then at 918 at least the value of $PJ_1$ 606 is paid to the player. At 920 the controller finishes and returns to 904 for the next iterative operation.

As can be appreciated, in an embodiment, each progressive jackpot pool $PJ_3$ 602, $PJ_2$ 604 and $PJ_1$ 606 may trigger independently or a trigger of a higher tier progressive pool may result in cascading triggers of the lower tiered progressive pools. For example, where the top tier or level three progressive jackpot $PJ_3$ 602 is trigger, its value is cascaded into the second tier progressive jackpot pool $PJ_2$ 604 and then the aggregate values of $PJ_3$ 602 and $PJ_2$ 604 cascade into the level one tier progressive jackpot pool $PJ_1$ 606 resulting in the aggregate value of all pools $PJ_3$ 602, $PJ_2$ 604 and $PJ_1$ 606 being awarded to the player. Where the second tier progressive jackpot pool $PJ_2$ 604 triggers its value $PJ_2$ 604 cascades into the level one tier progressive jackpot pool $PJ_1$ 606 resulting in the aggregate value of pools $PJ_2$ 604 and $PJ_1$ 606 being awarded to the player. Finally a level one progressive jackpot pool $PJ_1$ 606 may trigger independently resulting in only its value being awarded to the player. Thus the player can trigger and will the aggregate value of all of the pools (a level three trigger), tiers two and one with a level two trigger and only a level three pool award with a level three trigger.

In an embodiment triggering of a higher value tier progressive pool may or may not cause cascading triggering. Triggering of the lower tier progressive jackpot pool $PJ_1$ 606 will always result in the award of progressive jackpot pool $PJ_1$ 606. However, depending upon the trigger conditions, triggering of a higher tier progressive jackpot may cause some or none of the value to be awarded. That is, for example, triggering of the level 3 progressive jackpot pool $PJ_3$ 602 will cause all or a portion the value from the level 3 progressive jackpot pool $PJ_3$ 602 to cascade into the value for the level 2 progressive jackpot pool $PJ_2$ 604. Unless the added value causes the level 2 progressive jackpot pool $PJ_2$ 604 to trigger the player may only see the size of $PJ_2$ 604 increasing and the value of $PJ_3$ 602 to be reset. However the player knows that the funds added to $PJ_2$ 604 move it closer to satisfying its mystery trigger condition. When the award of $PJ_2$ 604 triggers its value is rolled into $PJ_1$ 606. Unless the added value causes $PJ_1$ 606 to trigger no award is issued and the player only sees the size of $PJ_1$ 606 increase and the value of $PJ_2$ 604 to be reset. However the player knows that the funds added to $PJ_1$ 606 increase it closer to satisfying its trigger condition.

As can also be appreciated an event may occur where the triggering of $PJ_3$ 602 causes, in sequence, $PJ_2$ 604 and $PJ_1$ 606 to also trigger resulting in the player being awarded the value of the progressive jackpot pool $PJ_1$ 606 and possibly values from the other pools.

In an embodiment when any of $PJ_3$ 602, or $PJ_2$ 604 or $PJ_1$ 606 have their trigger conditions satisfied a portion of the value of the pool may be awarded to the player and a portion is cascaded or pushed into the next level progressive jackpot pool or retained as in the case of $PJ_1$ 606. The award of the value of $PJ_1$ 606 can be awarded to the player apart from any triggering of $PJ_2$ 604 if the triggering condition for $PJ_1$ 606 is satisfied.

In a further embodiment when a higher level of progressive jackpot is triggered its value becomes associated with the next tier but is not included in determining whether the next tier's trigger condition has been satisfied. That is the value from $PJ_3$ 602 when triggered is added to the value of $PJ_2$ 604 but is not considered for purposes of determining whether the trigger condition for $PJ_2$ 604 is satisfied. In this fashion when the condition for $PJ_1$ 606 is satisfied the player may win the aggregate of not only the value of $PJ_1$ 606 but the value from one or more triggering events for $PJ_3$ 602, and $PJ_2$ 604 since those values may have been previously triggered and pushed down to $PJ_1$ 606.

Figure 8:
FIG. 8 shows the video display of FIG. 7 depicting the issuance of the prize.

FIG. 7 illustrates and event where the trigger condition for $PJ_1$ 606 has been satisfied and the value of the pool is awarded to the player. FIG. 8 shows an example of a celebration display attendant to such an award.

Figure 10:
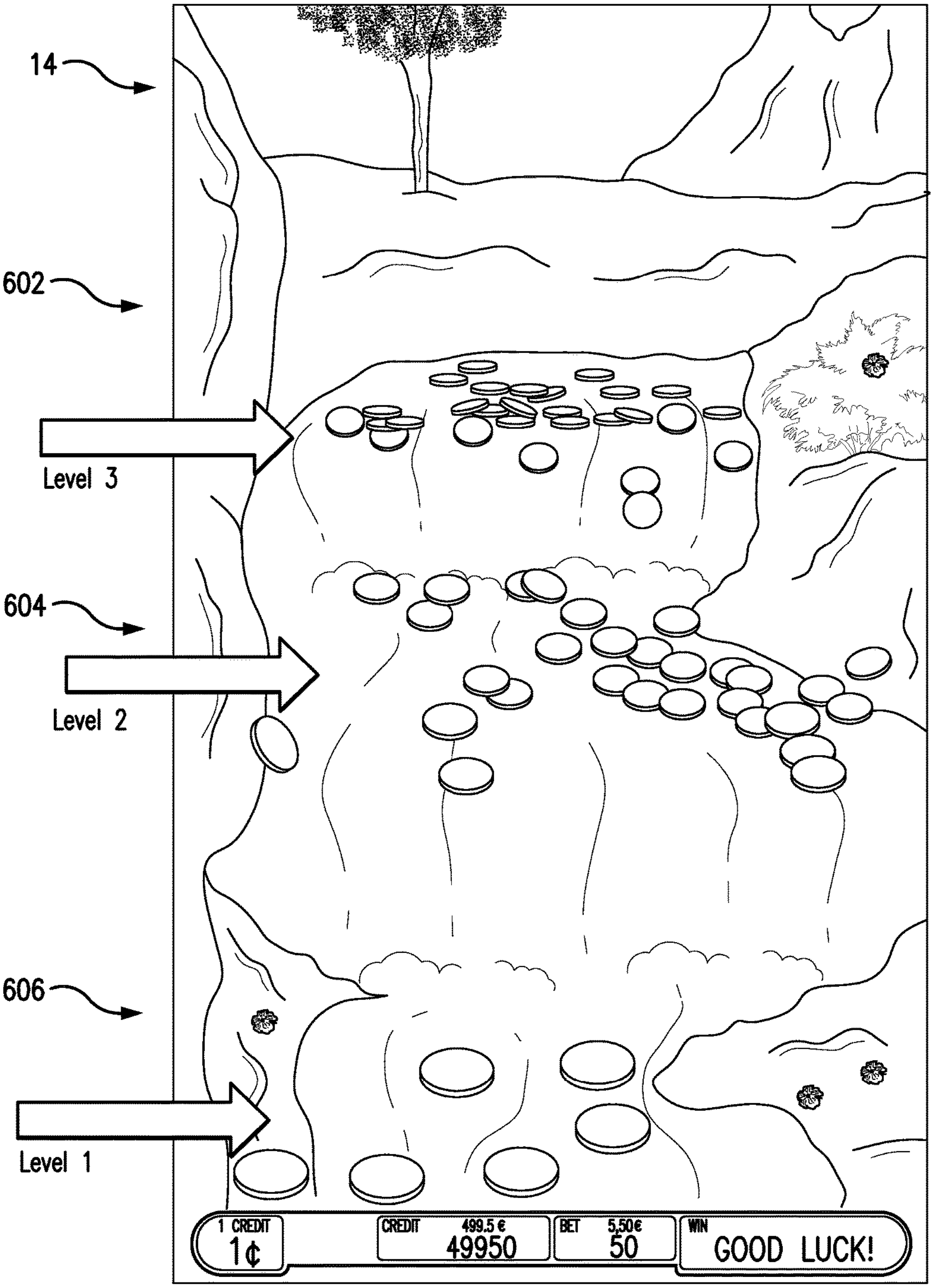
FIG. 10 shows the video display where all or a portion of the level 3 progressive jackpot pool is cascaded into the level 2 progressive jackpot pool.

FIG. 10 shows the display 14 when the trigger condition for the Level 3 progressive jackpot pool $PJ_3$ 602 has been satisfied and coins are depicted as being cascaded down into $PJ_2$ 604 and where no award to the player has occurred.

Figure 11:
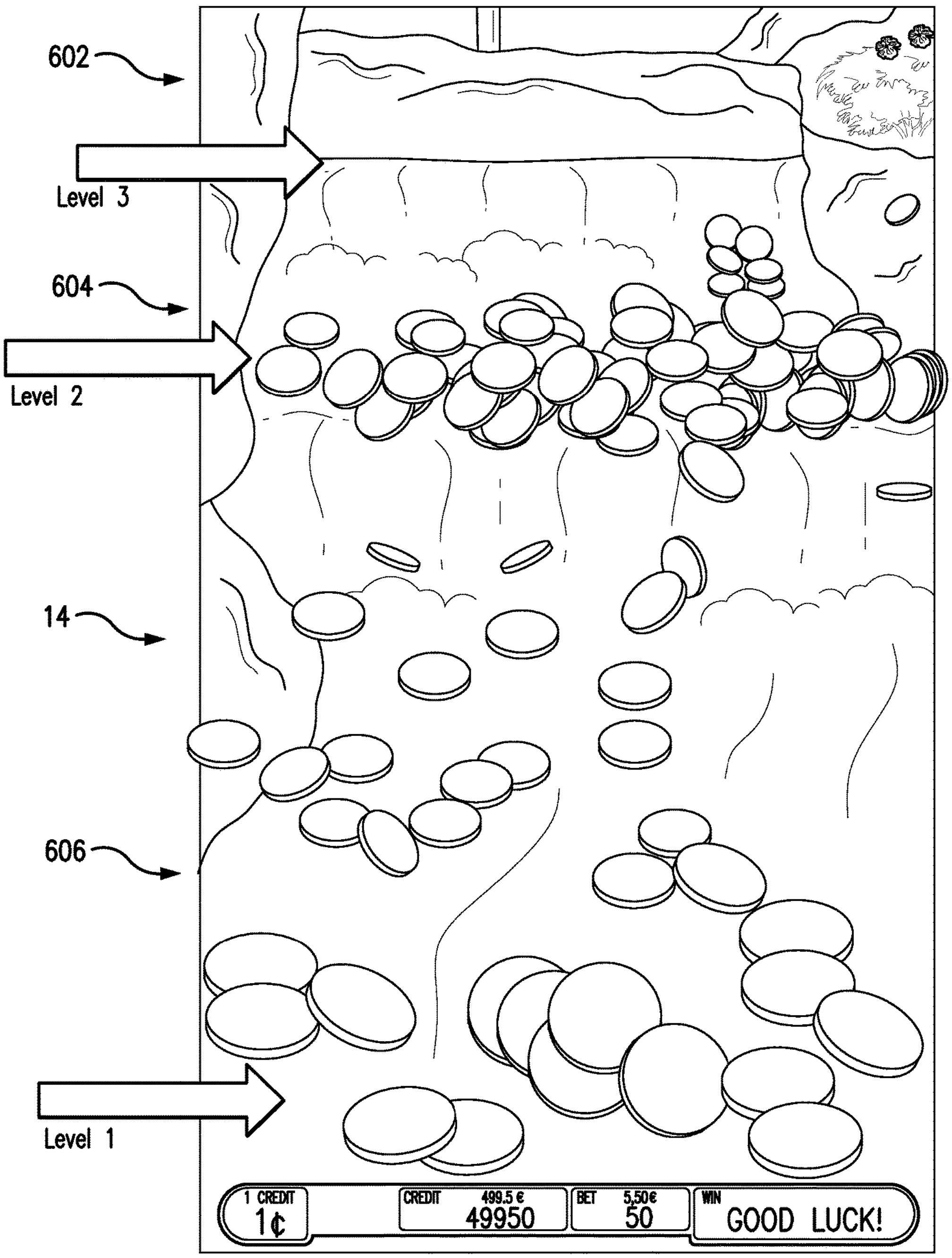
FIG. 11 shows the video display where all or a portion of the level 2 progressive jackpot pool is cascaded into the level 1 progressive jackpot pool.
Figure 12:
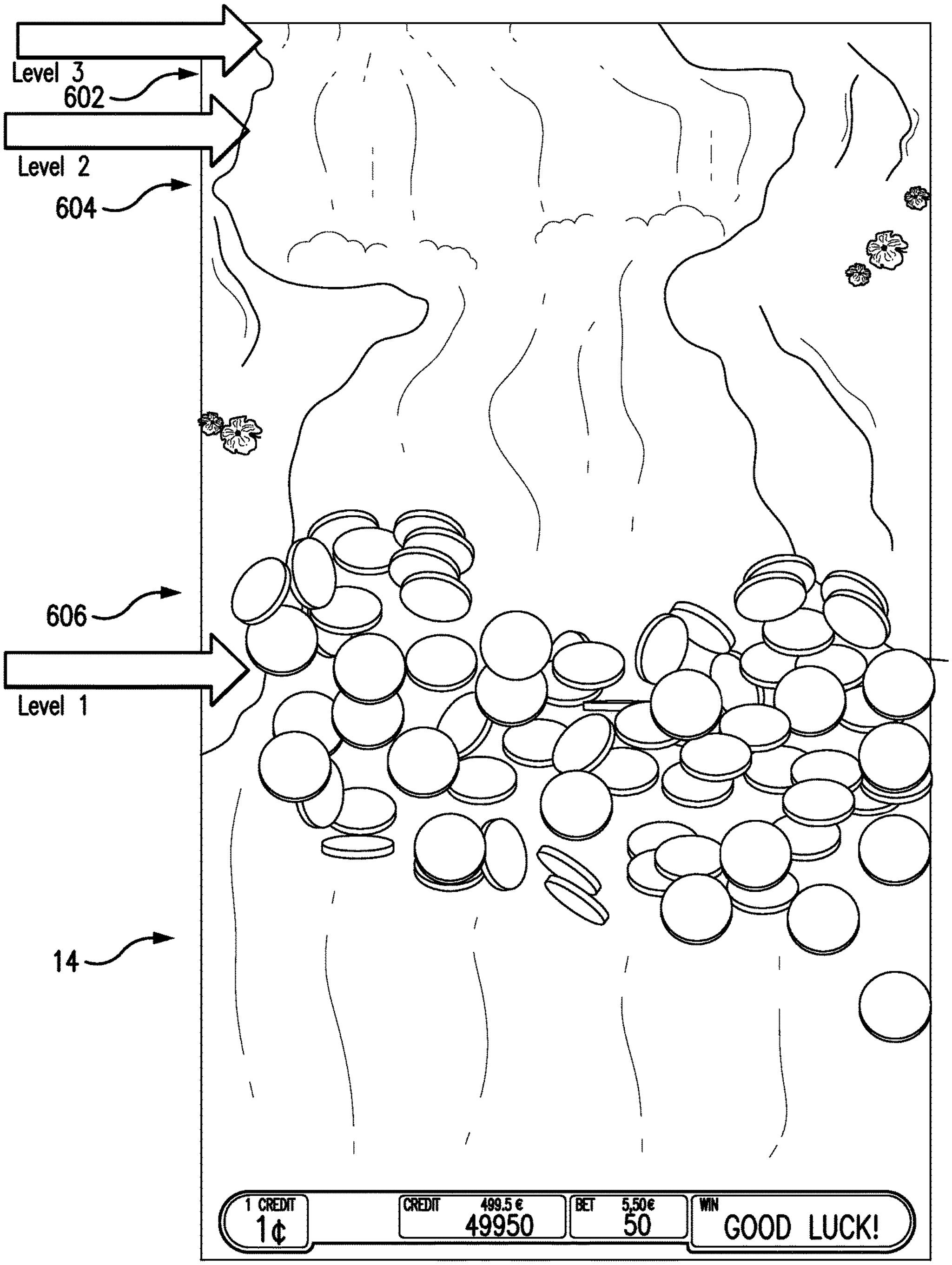
FIG. 12 shows the video display where all levels of the progressive jackpot pools is awarded to the player.

FIGS. 11 and 12 shows the condition where the progressive jackpot pools have been triggered as a result of $PJ_3$ 602 being triggered and wherein the cascading of value from $PJ_3$ 602 into $PJ_2$ 604 has caused that pool to trigger and the cascading value from $PJ_2$ 604 has caused $PJ_1$ 606 to trigger as well resulting in the award of the value of all pools to the player.

FIG. 13 shows the video display 14 controlled by the controller to re-stock or re-seed the progressive jackpot pools after a consecutive trigger event shown in FIGS. 11 and 12.

Figure 14:
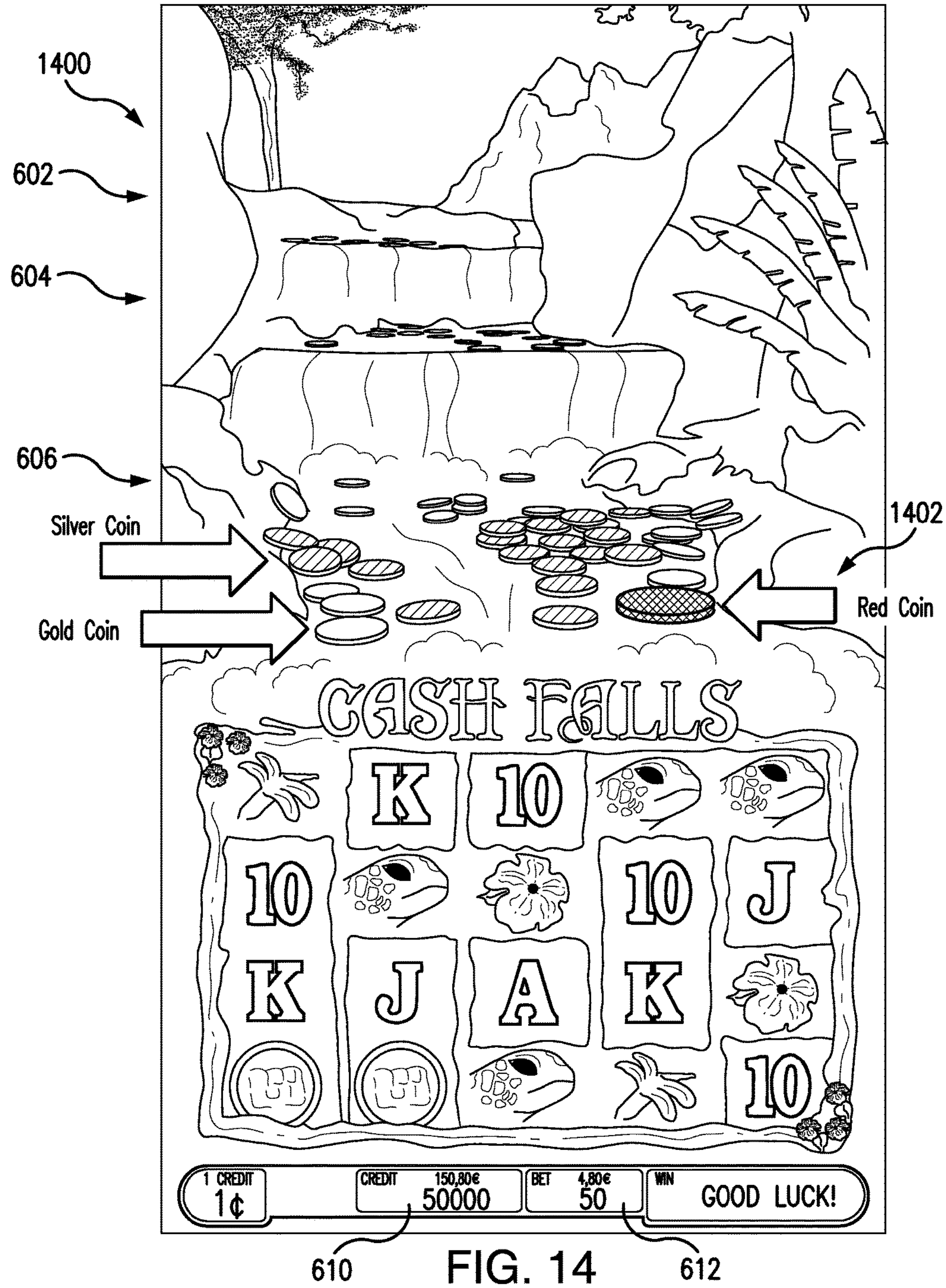
FIG. 14 shows the video display with a feature token shown as a red coin as part of one or more progressive jackpot pools.

FIG. 14 illustrates the display 1400 for an embodiment where a game feature, such as free games, has been awarded to a player in the base game. In lieu of immediately awarding the feature for play by the player an identifiable token such as a red coin 1402 may instead be awarded into one of the progressive jackpot pools $PJ_3$ 602, $PJ_2$ 604 or $PJ_1$ 606. FIG. 14 shows the red coin 1402 token being placed into the Level 1 progressive jackpot pool $PJ_1$ 606. As discussed above the feature has an expected value EV which may or may not be included toward determining whether a trigger criterion has been satisfied. When the Level 1 progressive jackpot pool $PJ_1$ 606 is awarded an entitlement to the red coin 1402 and the associated feature is also awarded to the player. The player may play a feature at the triggering gaming device 10 or may save the entitlement as disclosed in Lyons, et al U.S. Pat. No. 8,574,068 issued Nov. 5, 2013 and entitled "System, Apparatus and Method for Saving Game State and for Utilizing Game States on Different Gaming Devices" the disclosure of which is incorporated by reference herein for play at another gaming device 10. Multiple and different feature games could be awarded where plural gaming devices 10 are linked and be represented by different tokens.

The representations of the coins in the progressive jackpot pools $PJ_3$ 602, $PJ_2$ 604 and $PJ_1$ 606 may change their appearance. For example as the pools grow in value silver coins may transform into gold coins. The transformation indicates the increasing value of the pools. As but an example, where the Level 3 progressive jackpot pool $PJ_3$ 602 is triggered and has a value of $27, when it is pushed into the Level 2 progressive jackpot pool $PJ_2$ 604 the value may be depicted as two gold coins each with a value of $10 and seven silver coins each with a value of $1.

In an embodiment, and randomly, coins may fall from one progressive jackpot pool into another and/or to the player.

Inasmuch as the progressive jackpot pools are triggered according to predetermined random events and do not rely on the physics of sliding and tumbling coins like in the prior "pusher" games, the progressive prizes can be mathematically ascertained and confirmed for regulatory purposes. The physics associated with coin movement may simply graphically script what is taking place randomly.

In an embodiment the presentations of the displays associated with the progressive jackpot pools $PJ_3$ 602, $PJ_2$ 604 and $PJ_1$ 606 of FIGS. 6-8 and 10-14 may be displayed in a system driven shared display as described in Kelly et al U.S. Pat. No. 8,241,123 issued Aug. 14, 2012 and entitled "Video Switcher and Touch Router Method for a Gaming Machine" the disclosure of which is incorporated by reference. In this embodiment since the system is controlling the mystery progressive jackpot feature it can be displayed with the content of any game. The player may continuously view the progressive jackpot pools displays or may hide the view to allocate the entire display to the base game. The system may from time to time allocate features as tokens into one or more of the pools.

In an embodiment contributions to the various progressive jackpot pools may be occasioned by events such as symbols of combinations of symbols in the base game, triggering feature games or a system driven event such as based upon time (value added every 10 minutes during a particular period such as Tuesdays between 10 am and 6 pm to encourage play), based upon the players viewing advertising, upon gaming machines in the network hitting jackpots or the like. Additional disclosures and figures are included as an Appendix which is incorporated by reference herein.

While the description above discloses three jackpot levels it should be understood that there may be two levels or more than three levels.

As described above a trigger condition can cause one pool to move into another without an award, cause one pool to be awarded, cause one pool to move into another triggering the receiving pool to be awarded or can cause a cascading event where, for example, $PJ_3$ 602 it triggered and some or all of its current value cascades to $PJ_2$ 604 causing some or all of its current value to cascades to $PJ_1$ 606 causing, in turn, some or all of some or all $PJ_3$ 602, $PJ_2$ 604 and $PJ_1$ 606 to be awarded to the player.

In an embodiment the display of the various pools $PJ_3$ 602, $PJ_2$ 604 and $PJ_1$ 606 such as shown in FIG. 10 can be provided as by streaming to gaming devices 10 such as to their PTMs 28 or system driven shared displays as described in Kelly et al U.S. Pat. No. 8,241,123 identified above. This may be even to gaming devices 10 which are not participating in the progressive system.

In an embodiment a random number generator may from time-to-time determine to trigger the movement of some of the assets from one pool to another. IN this embodiment, and using the physics modelling software, this may be shown as coins bouncing/falling/shifting from one pool to another. In some cases coins may bounce to be awarded to the player.

The foregoing description, for purposes of explanation, uses specific nomenclature and formula to provide a thorough understanding of the invention. It should be apparent to those of skill in the art that the specific details are not required in order to practice the invention. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

What is claimed is:

1. An improved system including one or more gaming devices configured for receiving a wager from a player to play a base game, rendering a winning or losing outcome and issuing an award to the player for said winning outcomes, said system comprising:

a controller configured to allocate value to first and second progressive jackpot pools to progressively increase the values thereof, said first progressive jackpot pool having a first trigger set at a pool value of X and said second progressive jackpot pool having a second trigger set at a pool value of Y where X<Y, said values based at least in part upon said player wager;

a video display to display graphical representations of each of said first and second pools as a mass whose accumulated mass is displayed to increase as the pool value increases;

said controller configured to determine the current value of said first progressive jackpot pool with each allocated contribution and if the first progressive jackpot pool current value ≥X to allocate at least a portion of said first progressive jackpot pool to the second progressive jackpot pool and to determine with said allocation the current value of the second progressive pool and if said second progressive pool current value ≥Y to award a progressive prize of at least a portion of said second progressive pool to said player.

2. The system of claim 1 comprising at least one of said controller and a graphics processor configured to control said video display to display a portion of said mass associated with said first progressive jackpot pool moving to the mass representing said second progressive jackpot pool contemporaneously with said allocation at least a portion of said first progressive jackpot pool to the second progressive jackpot pool.

3. The system of claim 2 comprising at least one of said controller and a graphics processor configured to control said video display to display said mass as coins.

4. The system of claim 1 comprising said controller configured to control said display to display the issuance of said prize as dispensing virtual objects to said player.

5. The system of claim 1 comprising said controller configured to allocate a virtual token representing a prize feature having an expected value EV to at least one of said first and second progressive jackpot pools and at least one of said controller and a graphics processor configured (ii) to control said display to display said token as a distinctive object commingled with said mass, (iii) to control said display to display the issuance of said prize as dispensing at least a portion of the mass to said player and (iv) in the event the virtual token is to be issued as the at least a portion of the mass to provide the player with a play of a secondary game having an expected value equal to said EV.

6. The system of claim 5 comprising said controller configured to allocate said virtual token as a prize feature benefit as the play of one or more of a set for free plays of said base game or a free play of a secondary game.

7. The system of claim 1 comprising said controller is configured to, if said second progressive pool current value ≥Y, award as said progressive prize of said first and second progressive prize pools.

8. The system of claim 1 comprising at least one of said controller and a graphics processor configured to control said video display to display (i) said first progressive jackpot pool as a mass of coins disposed above said second progressive jackpot pool also depicted as a mass of coins and (ii) coins depicted in relation to said first progressive jackpot pool cascading into the coins depicted in relation to said second progressive jackpot pool contemporaneously with said allocation at least a portion of said first jackpot pool to the second progressive jackpot pool.

9. The system of claim 1 comprising $R_1 \leq X \leq M_1$ and $R_2 \leq Y \leq M_2$ where $R_1$ and $R_2$ are selected reset values for the first and second progressive jackpot pools respectively, and $M_1$ and $M_2$ are selected maximum values for the first and second progressive jackpot pools, respectively.

10. An improved system including one or more gaming devices configured for receiving a wager from a player to play a base game, rendering a winning or losing outcome and issuing an award to the player for said winning outcomes, said system comprising:

a controller configured to allocate value to defined first and second progressive jackpot pools to progressively increase the value thereof, said first pool having a first trigger of a pool value of X and said second trigger having a second trigger of a pool value of Y where X<Y;

a video display to display graphical representations of said first and second pools as a mass of objects whose accumulated mass is displayed to increase as the pool value increases;

said controller configured to determine the current value of said first progressive jackpot pool with each allocated contribution and if the first progressive jackpot pool current value ≥X to associate at least a portion of said first progressive jackpot pool to the second progressive jackpot pool, said associated portion of said at least a portion of said first progressive jackpot pool disregarded with respect to the second progressive pool value Y and if said second progressive jackpot pool current value ≥Y to award a progressive prize of at least a portion of said second progressive pool and said associated portion of said at least a portion of said first progressive jackpot pool to said player.

11. A system for providing a plurality of progressive jackpot pools available for awarding prizes to players of devices for making wagers to play a base game and obtain an outcome, said devices associated with one or more video displays and adapted to communicate with a network, said system comprising:

a data structure storing data for administering first and second progressive jackpots pools $PJ_1$ and $PJ_2$ including data representing trigger values X and Y, respectively, and current pool values;

a controller in communication with said network and said data structure to administer $PJ_1$ and $PJ_2$ and to progressively increment the value of each of $PJ_1$ and $PJ_2$ related to the play of said devices;

one or more of said controller and graphics processor configured to control said one or more video displays to display graphical representations of $PJ_1$ and $PJ_2$ as a mass of objects whose accumulated mass is displayed to change as the pool value increases;

said controller configured to determine the current value of $PJ_1$ based upon said increments to the value of $PJ_1$ and if the $PJ_1$ value ≥X to allocate at least a portion of $PJ_1$ to $PJ_2$ and to determine with said allocation the current value of $PJ_2$ and if said current value of $PJ_2 \geq Y$ to award a progressive prize of at least a portion of $PJ_2$ to at least one player.

12. The system of claim 11 comprising said controller is configured to allocate portions of said wagers made at said devices to said first and second progressive jackpots pools $PJ_1$ and $PJ_2$ and to determine the triggering device associated with the wager which caused $PJ_1$ value ≥X and to award a progressive prize of at least a portion of $PJ_1$ to said triggering device.

13. The system of claim 11 comprising at least one of said controller and a graphics processor configured to control said one or more video displays to display a portion of said mass of objects associated with said first progressive pool moving to the mass of objects representing said second progressive pool contemporaneously with said allocation at least a portion of said first jackpot pool to the second progressive jackpot pool.

14. The system of claim 11 comprising at least one of said controller and a graphics processor configured to control said video display to display said mass of objects as a mass of coins.

* * * * *